(12) United States Patent
Irie et al.

(10) Patent No.: US 10,346,694 B2
(45) Date of Patent: Jul. 9, 2019

(54) VEHICLE START SUPPORT DEVICE

(71) Applicant: Clarion Co., Ltd., Saitama-shi (JP)

(72) Inventors: Kota Irie, Saitama (JP); Daisuke Fukuda, Saitama (JP); Kenji Kato, Saitama (JP); Shinya Tagawa, Saitama (JP)

(73) Assignee: Clarion Co., Ltd., Saitama (JP)

( * ) Notice: Subject to any disclaimer, the term of this patent is extended or adjusted under 35 U.S.C. 154(b) by 58 days.

(21) Appl. No.: 14/916,174

(22) PCT Filed: Jul. 16, 2014

(86) PCT No.: PCT/JP2014/068934
§ 371 (c)(1),
(2) Date: Mar. 2, 2016

(87) PCT Pub. No.: WO2015/056472
PCT Pub. Date: Apr. 23, 2015

(65) Prior Publication Data
US 2016/0203377 A1    Jul. 14, 2016

(30) Foreign Application Priority Data

Oct. 18, 2013  (JP) ................. 2013-217301

(51) Int. Cl.
*G06K 9/00* (2006.01)
*H04N 5/232* (2006.01)
(Continued)

(52) U.S. Cl.
CPC ............ *G06K 9/00805* (2013.01); *B60R 1/00* (2013.01); *G06K 9/00791* (2013.01);
(Continued)

(58) Field of Classification Search
CPC ................ B60R 2300/802; B60R 1/00; G06K 9/00791; G06K 9/00805; G06K 9/00812;
(Continued)

(56) References Cited

U.S. PATENT DOCUMENTS

2007/0173983 A1\*  7/2007  Takahashi ................. B60R 1/00
                                                                701/1
2009/0174574 A1   7/2009  Endo et al.
(Continued)

FOREIGN PATENT DOCUMENTS

CN          101676149 A       3/2010
CN          102632840 A       8/2012
(Continued)

*Primary Examiner* — Thai Q Tran
*Assistant Examiner* — Nienru Yang
(74) *Attorney, Agent, or Firm* — Blank Rome LLP

(57) ABSTRACT

When a vehicle starts, a surrounding state is securely provided to a driver. When a vehicle operation detector detects that there is a possibility that a parked vehicle starts, a vehicle surrounding state recognizer recognizes a state of surrounding of the vehicle based on images imaged by a plurality of cameras imaging a plurality of different areas of the surrounding of the vehicle. A parking style determiner determines a parking style executed in parking at a position where the vehicle now parks based on a recognition result of the vehicle surrounding state recognizer. A monitoring area setter sets a monitoring area where a driver is required to pay attention when the vehicle is started based on a determination result of the parking style determiner. A vehicle surrounding state provider provides a driver with information provision in the monitoring area.

9 Claims, 27 Drawing Sheets

(51) Int. Cl.
*B60R 1/00* (2006.01)
*H04N 7/18* (2006.01)
*G08G 1/16* (2006.01)
*H04N 5/247* (2006.01)

(52) U.S. Cl.
CPC ..... *G06K 9/00798* (2013.01); *G06K 9/00812* (2013.01); *G08G 1/168* (2013.01); *H04N 5/23293* (2013.01); *H04N 5/247* (2013.01); *H04N 7/181* (2013.01); *B60R 2300/802* (2013.01); *G08G 1/16* (2013.01); *H04N 7/18* (2013.01)

(58) Field of Classification Search
CPC .. G06K 9/00798; G06K 9/00; H04N 5/23293; H04N 7/181; H04N 5/232; H04N 7/18; G08G 1/168
USPC ........................................................ 348/118
See application file for complete search history.

(56) References Cited

U.S. PATENT DOCUMENTS

| | | | |
|---|---|---|---|
| 2009/0303027 A1* | 12/2009 | Nagamine | B60Q 9/005 340/435 |
| 2010/0070139 A1 | 3/2010 | Ohshima et al. | |
| 2012/0197492 A1* | 8/2012 | Schneider | B62D 15/028 701/41 |
| 2012/0200705 A1 | 8/2012 | Saigusa et al. | |
| 2013/0063601 A1* | 3/2013 | Wakabayashi | B60R 1/00 348/148 |
| 2014/0327776 A1 | 11/2014 | Michiguchi et al. | |

FOREIGN PATENT DOCUMENTS

| | | |
|---|---|---|
| CN | 103010025 A | 4/2013 |
| CN | 103987582 A | 8/2014 |
| EP | 1 403 138 A1 | 3/2004 |
| EP | 2 017 138 A1 | 1/2009 |
| EP | 2 130 736 A1 | 12/2009 |
| JP | 2003-306105 A | 10/2003 |
| JP | 2007-118876 A | 5/2007 |
| JP | 2008-290669 A | 12/2008 |
| JP | 2008-302711 A | 12/2008 |
| JP | 2009-040319 A | 2/2009 |
| JP | 2011-219090 A | 11/2011 |
| JP | 2013-149179 A | 8/2013 |

* cited by examiner

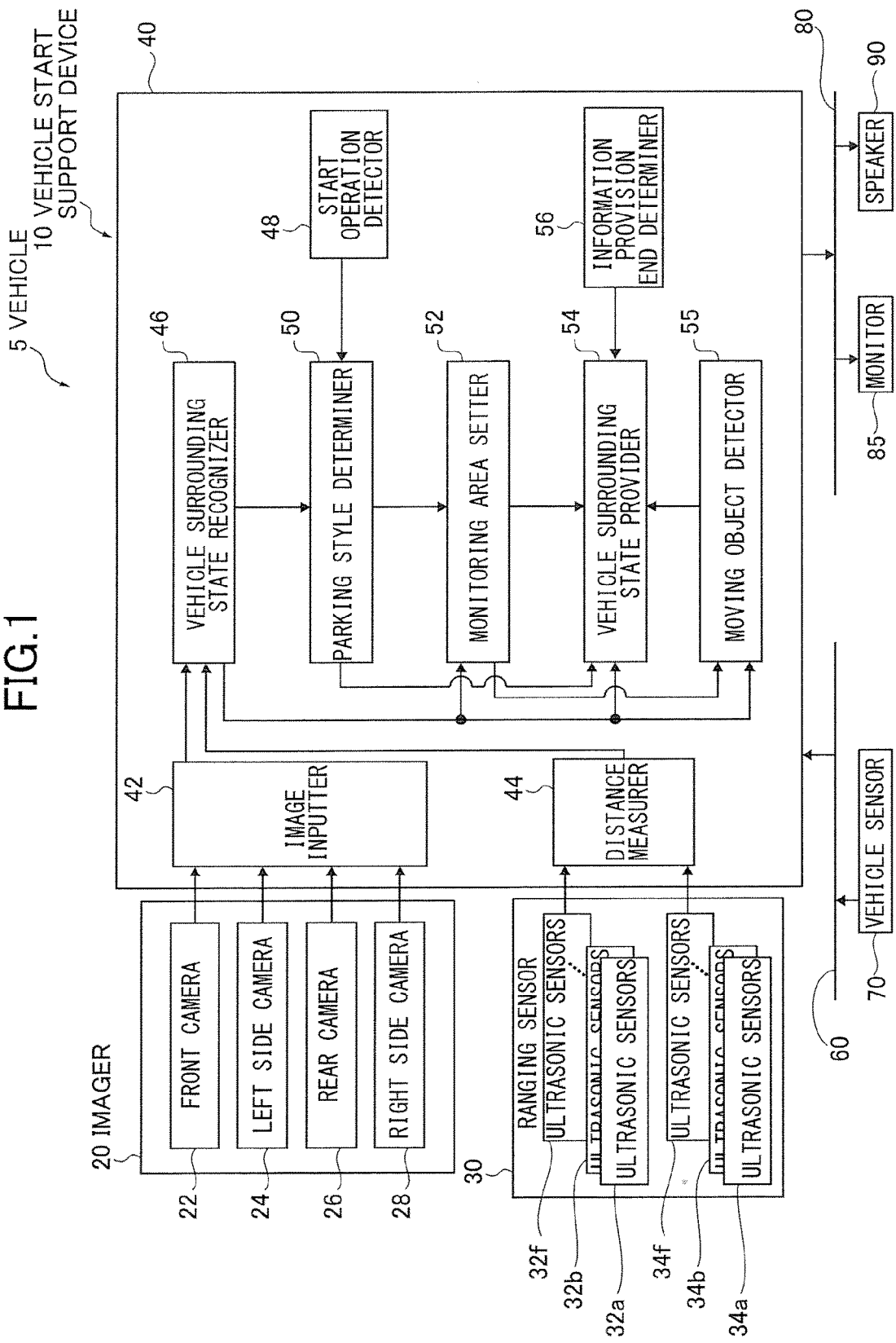

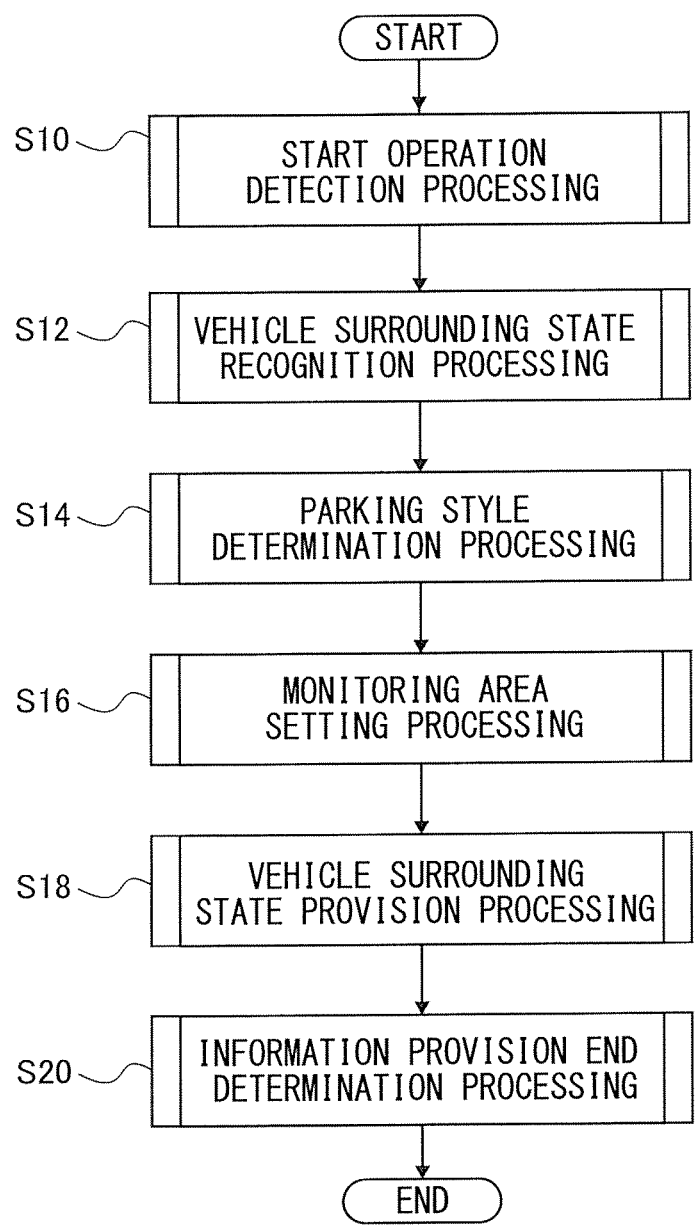

FIG.8

| | INFORMATION REGARDING PRESENCE AND ABSENCE OF OTHER ADJACENT VEHICLE | | | INFORMATION REGARDING PARKING FRAME | | | INFORMATION REGARDING OBSTACLE OTHER THAN RIGHTWARD AND LEFTWARD VEHICLES G | INFORMATION REGARDING CURBSTONE, ROADSIDE H |
|---|---|---|---|---|---|---|---|---|
| | RIGHT AND LEFT DIRECTIONS | | PRESENCE AND ABSENCE OF VEHICLES IN FRONT AND REAR DIRECTIONS C | PRESENCE AND ABSENCE OF PARKING FRAME LINES ADJACENT TO OWN VEHICLE D | PRESENCE AND ABSENCE OF RIGHT AND LEFT PARKING FRAME LINES OF OWN VEHICLE E | ENDPOINTS OF RIGHT AND LEFT PARKING FRAME LINES OF OWN VEHICLE F | | |
| | PRESENCE AND ABSENCE OF VEHICLE A | POSITION OF VEHICLE B | | | | | | |
| PERPENDICULAR PARKING | ○ | ○ | ○ | ○ | ○ | ○ | | ○ |
| ANGLE PARKING | ○ | ○ | ○ | | ○ | ○ | | ○ |
| PARALLEL PARKING | ○ | | ○ | ○ | ○ | | ○ | ○ |
| OTHER PARKING | ○ | | ○ | | | | ○ | |

○: INFORMATION USED TO DETERMINATE PARKING STYLES
(There is a case capable of determining by only a part of the information to which sign ○ is attached)

FIG.10

| DETERMINED PARKING STYLE | SHIFT POSITION | SET MONITORING AREA K (DRAWING NUMBER SHOW ACTUAL EXAMPLE) | | | |
|---|---|---|---|---|---|
| | | FRONT OF OWN VEHICLE | LEFT SIDE OF OWN VEHICLE | RIGHT SIDE OF OWN VEHICLE | REAR OF OWN VEHICLE |
| PERPENDICULAR PARKING | D RANGE | ○(FIG. 11A) | — | — | — |
| | R RANGE | — | — | — | ○(FIG. 11B) |
| ANGLE PARKING | D RANGE | ○ | △ | △ | — |
| | R RANGE | — | △ (FIGs. 12A, 12B) | △ | ○ (FIGs. 12A, 12B) |
| PARALLEL PARKING | D RANGE | △ | △ | △ (FIGs. 13A, 13B) | △ (FIGs. 13A, 13B) |
| | R RANGE | — | △ | △ | △ |
| OTHER PARKING | D RANGE | ○ | ○ | ○ | ○ |
| | R RANGE | ○ | ○ | ○ | ○ |

○ : SETTING TO MONITORING AREA
△ : SETTING TO MONITORING AREA WHEN ADJACENT VEHICLE DOES NOT EXIST IN A DIRECTION, OR WHEN FACING ROADWAY
— : NON-SETTING TO MONITORING AREA

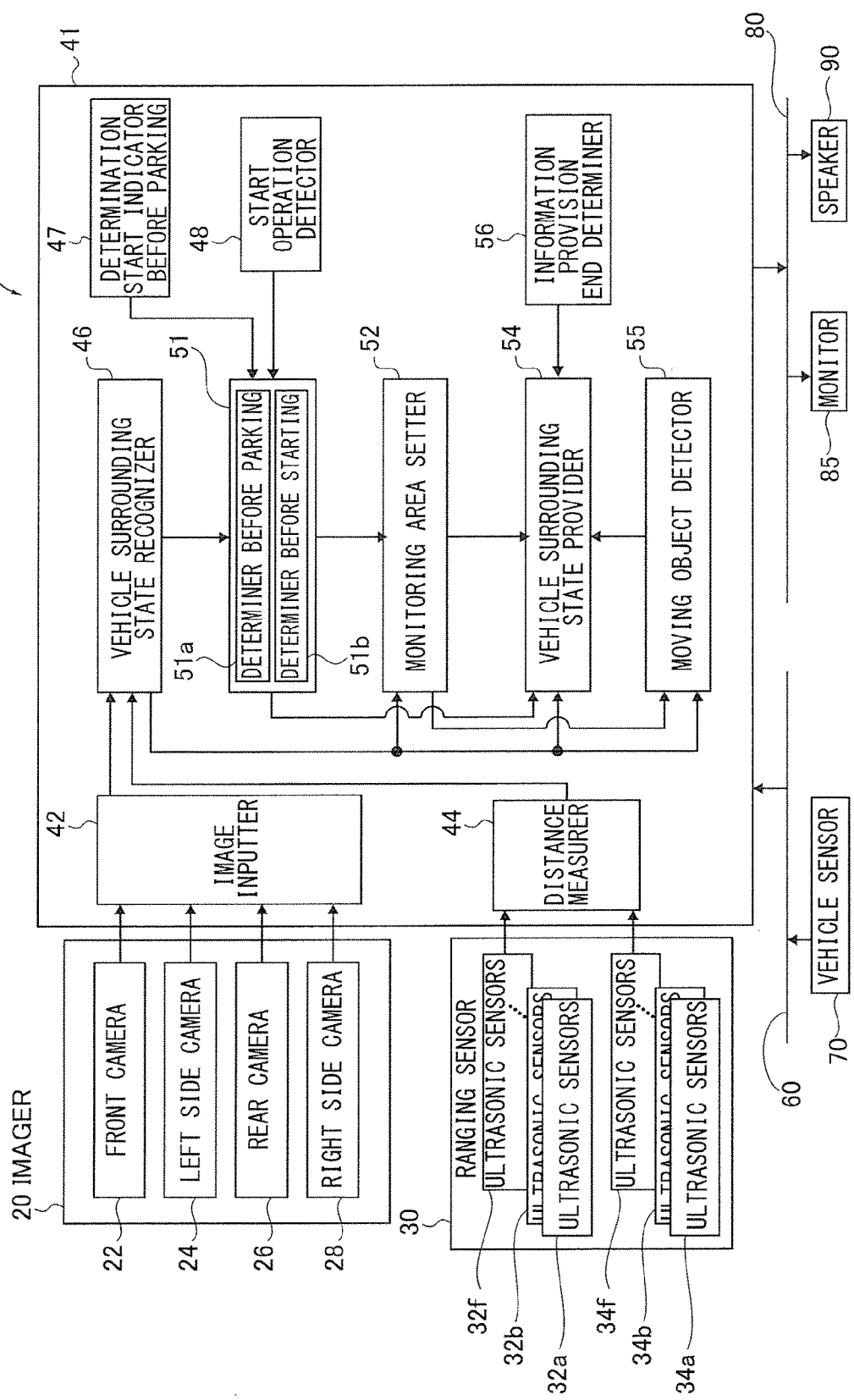

US 10,346,694 B2

VEHICLE START SUPPORT DEVICE

TECHNICAL FIELD

The present invention relates to a vehicle start support device that provides a driver with attention attraction or necessary vehicle control in starting a vehicle parked in a parking section.

BACKGROUND ART

A driver requires performing drive operation while confirming a surrounding state of a vehicle to avoid collision with an obstacle around the vehicle or object approaching the vehicle from a distance in starting the vehicle parked in a parking section from the parking section. As a method of confirming a state of surroundings of an own vehicle, a driver directly confirms with eyes, and a system enlarging a field range simulatively is implemented by displaying an image on a monitor by a mirror or camera to supplement a dead area. Further, to assist driver's judge, not only the driver confirms with eyes, but also a system that detects and notifies obstacles or approaching vehicles around the own vehicle is also implemented.

In this way, to assist a visual field of a driver by a camera, a sensor such as a sonar or the like, it is required to switch a field direction or field range necessary to attract attention in accordance with a parking style such as a parallel parking or perpendicular parking. Therefore, various inventions have been proposed (for example, see Patent Literatures 1 and 2).

CITATION LIST

Patent Literature

Patent Literature 1: JP2003-306105A
Patent Literature 2: JP2009-40319A

SUMMARY

Technical Problem

A start support device described in Patent Literature 1 classifies a kind of parking places by input operation of a driver.

In addition, in Patent Literature 1, a parking style is classified in two kinds of a perpendicular parking and a parallel parking.

However, according to an invention disclosed in Patent Literature 1, because the parking style is classified by input operation of a driver, there is a problem that the input operation is required every parking, and hence a burden is imposed on a driver.

Moreover, because the parking style is classified in the two kinds of the perpendicular parking and the parallel parking, there is a problem that an image or an alarm notifying that obstacles are approaching is not provided with respect to other parking style.

Furthermore, even in the same perpendicular parking, areas necessary to attract attention in starting the vehicle differ between a case where the perpendicular parking is executed with retreat and a case where the perpendicular parking is executed with advance. There is a problem that a content described in Patent Literature 1 cannot correspond to a change in such a state.

On the other hand, a drive support device in Patent Literature 2 detects an obstacle(s) of surroundings of a vehicle by use of a detector of millimeter wave radar, sonar, infrared ray and so on, and supports the start of a vehicle from a parallel parking state in accordance with a detection state of the obstacles.

However, it is difficult to recognize a parking style other than the parallel parking by only the detector. Accordingly, there is a problem that it is difficult to execute suitable starting support when the vehicle has a parking style other than the parallel parking.

The present invention is made in view of the foregoing problems and an object of the present invention is to provide a vehicle start support device capable of suitably providing a driver with a state of surroundings of a vehicle in starting the vehicle without being limited to a parking style.

Solution to Problem

The vehicle start support device according to the present invention includes an imager having a plurality of cameras provided to direct different areas of surroundings of a vehicle and imaging images including a part of the vehicle and a road surface; a start operation detector to detect that operation having a possibility of starting the vehicle which is parking is executed; a vehicle surrounding state recognizer that recognizes a state of the surroundings of the vehicle based on the images imaged by the cameras; a parking style determiner that determines a parking style executed in parking at a position where the vehicle parks now, based on a recognition result of the vehicle surrounding state recognizer when detecting that there is a possibility of starting the vehicle in the start operation detector; a monitoring area setter that sets an area where a driver of the vehicle should pay attention in starting the vehicle, based on a determination result of the parking style determiner and the recognition result of the vehicle surrounding state recognizer; a moving object detector that detects a moving object approaching the vehicle in the area set in the monitoring area setter; a vehicle surrounding state provider that provides the driver of the vehicle with information with respect to an area necessary to attract attention in starting the vehicle, based on a setting result of the monitoring area setter, the determination result of the parking style determiner, and a detection result of the moving object detector; and an information provision end determiner that ends the information provision by determining a timing that ends to provide the information from the vehicle surrounding state provider, based on at least a behavior of the vehicle.

According to the vehicle start support device of the present invention configured in this way, when the start operation detector detects that there is a possibility that the parking vehicle starts, the vehicle surrounding state recognizer recognizes a state of surroundings of the vehicle, based on the images imaged by the imagers. The parking style determiner determines a parking style executed when the vehicle parks at a present parking position, based on a recognition result of the vehicle surrounding state recognizer. The monitoring area setter sets an area where the driver requires to pay attention when starting the vehicle based on a determination result of the parking style determiner and a recognition result of the vehicle surrounding state recognizer. Next, the moving object detector detects the moving object approaching the vehicle in the area set in the monitoring area setter, and the vehicle surrounding state provider provides the driver with information provision with respect to the set area. The information provision end determiner allows the information provision from the vehicle surrounding state provider to end when it is determined that the start operation is completed based on a behavior of the vehicle.

Accordingly, the information provision or the attention attraction for accurate start operation can be given to the driver in accordance with the parking style, and further the information provision can be automatically completed when the start operation is completed. As a result, because unnecessary attention attraction is not provided, the driver can securely and smoothly start the vehicle without confusing the driver by the unnecessary information provision. The driver can receive accurate information provision to support the start of the vehicle without requiring any special operation in starting the vehicle. In addition, because the detection of the moving object may execute only in the set monitoring area, it is possible to efficiently execute the detection processing of the moving object.

Advantageous Effects

In the vehicle start support device according to the present invention, it is possible to execute accurate start support in starting a vehicle without requiring special labor of a driver, because information provision or attention attraction is executed in a monitoring area as set based on a parking style when parking the vehicle.

BRIEF DESCRIPTION OF DRAWINGS

FIG. 1 is a system configuration diagram showing an entire configuration of a vehicle start support device according to a first embodiment of the present invention.

FIG. 6 is a flow chart showing operation sequence of the vehicle start support device according to the first embodiment of the present invention.

FIG. 8 is a diagram explaining a determining method of the parking style in the vehicle start support device according to the first embodiment of the present invention.

FIG. 10 is an explanatory view explaining a setting method of a monitoring area in the vehicle start support device according to the first embodiment of the present invention.

FIG. 19 is a system configuration diagram showing an entire configuration of a vehicle start support device according to a second embodiment of the present invention.

DETAILED DESCRIPTION OF EMBODIMENTS

Figure 2A:
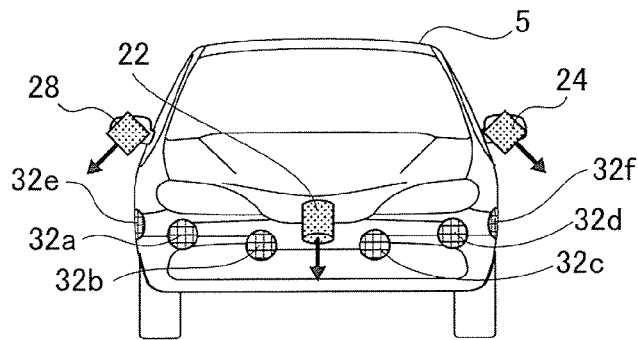
FIG. 2A is an external view showing a vehicle on which the vehicle start support device according to the first embodiment is mounted, wherein a front view of the vehicle is shown.

Embodiments of a vehicle start support device according to the present invention will be described hereinafter with reference to the accompanying drawings.

First Embodiment

A first embodiment is an example in which the present invention is applied to a vehicle start support device that provides a driver with information necessary to attention attraction around a vehicle and supports start operation when starting the vehicle which is parking.
[Description of Configuration of Vehicle Start Support Device]

A configuration of the first embodiment is described with reference to FIG. 1 and FIGS. 2A to 2C. The vehicle start support device 10 according to the first embodiment is installed on a vehicle 5 and includes a plurality of imagers 20, a ranging sensor 30, an electronic controller 40, a vehicle information communicator 60, a vehicle sensor 70, a video and audio communicator 80, a monitor 85, and a speaker 90.

The imagers 20 are composed of a plurality of cameras each having either one of a CMOS sensor, a CCD sensor and so on. The cameras include a front camera 22 that images a front of the vehicle 5, a left side camera 24 that is mounted on a left door mirror of the vehicle and images a left side of the vehicle 5, a rear camera 26 that images a rear of the vehicle 5, and a right side camera 28 that is mounted on a right door mirror of the vehicle 5 and images a right side of the vehicle 5. The mounting of the imagers 20 on the vehicle is described hereinafter.

The ranging sensor 30 is composed of a sensor such as an ultrasonic sensor, a laser radar and so on, and is mounted on the vehicle 5 to be directed to the front and the rear of the vehicle 5. The mounting of the ranging sensor 30 on the vehicle 5 is described hereinafter.

The electronic controller 40 determines a parking style formed in parking the vehicle at a present position based on an image of surroundings of the vehicle 5 imaged in the imagers 20 and a distance to an obstacle at the surroundings of the vehicle 5 measured by the ranging sensor 30, when the start operation of the vehicle 5 is detected (as described hereinafter) and provides a driver of the vehicle 5 with information supporting the start operation in accordance with the determined parking style.

The electronic controller 40 includes an image inputter 42, a distance measurer 44, a vehicle surrounding state recognizer 46, a start operation detector 48, a parking style determiner 50, a monitoring area setter 52, a vehicle surrounding state provider 54, a moving object detector 55, and an information provision end determiner 56.

The image inputter 42 converts an image imaged in the imagers 20 into a digital signal by A-D conversion and outputs the digital signal.

The distance measurer 44 converts distance data measured in the ranging sensor 30 into digital data by A-D conversion and outputs the digital data.

The vehicle surrounding state recognizer 46 detects parking frame lines of the surroundings of the vehicle 5, adjacent vehicles to the vehicle 5, obstacles excepting vehicles, curbstones, or roadsides by using the digital signal (image) output from the image inputter 42 and the digital data (distance) output from the distance measurer 44.

The start operation detector 48 detects that the driver of the vehicle 5 performs operation enabling the driver to start the vehicle 5.

The parking style determiner 50 determines a parking style formed in parking the vehicle at a position where the vehicle 5 presently parks based on a recognized result of the vehicle surrounding state recognizer 46.

The monitoring area setter 52 sets an area where the driver should pay attention when starting the vehicle based on a determined result of the parking style determiner 50 and the recognized result of the vehicle surrounding state recognizer 46.

The moving object detector 55 detects a moving object approaching the vehicle 5 in a set monitoring area based on the recognized result of the vehicle surrounding state recognizer 46 and a set result of the monitoring area setter 52.

The vehicle surrounding state provider 54 executes information provision relating to a surrounding state of the vehicle necessary to pay attention in starting the vehicle 5 to the driver of the vehicle 5 based on the set result of the monitoring area setter 52, the determined result of the parking style determiner 50 and the recognized result of the vehicle surrounding state recognizer 46, and a detected result of the moving object detector 55.

The information provision end determiner 56 determines the end of the information provision from the vehicle surrounding state provider 54 to complete the information provision based on behavior of the vehicle 5.

The vehicle information communicator 60 is composed of a Local Area Network (LAN) and executes communication of vehicle information measured in various sensors set in the vehicle, or control information necessary to control the vehicle.

The vehicle sensor 70 is connected to the vehicle information communicator 60 to detect various states of the vehicle. More specifically, the vehicle sensor is configured to employ, for example, an ignition switch (not shown) that detects an operation state of an engine, a shift position sensor (not shown) that detects a shift position, a winker switch (not shown) that detects an operation state of a direction indicator, a speed sensor (not shown) that detects a vehicle speed, and a steering angle sensor (not shown) that detects a steering angle.

The video and audio communicator 80 is composed of a Local Area Network (LAN) and executes communication of image information or audio information output to the monitor 85 mounted on the vehicle and audio information output to the speaker 90.

Next, a mounting state of the imagers 20 and the ranging sensor 30 on the vehicle 5 is described with reference to FIGS. 2A to 2C.

Figure 2B:
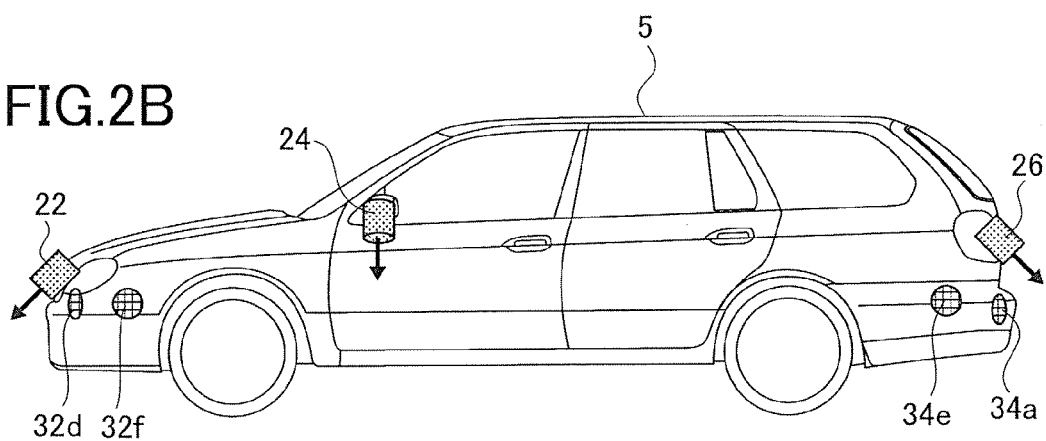
FIG. 2B is an external view showing a vehicle on which the vehicle start support device according to the first embodiment is mounted, wherein a side view of the vehicle is shown.
Figure 2C:
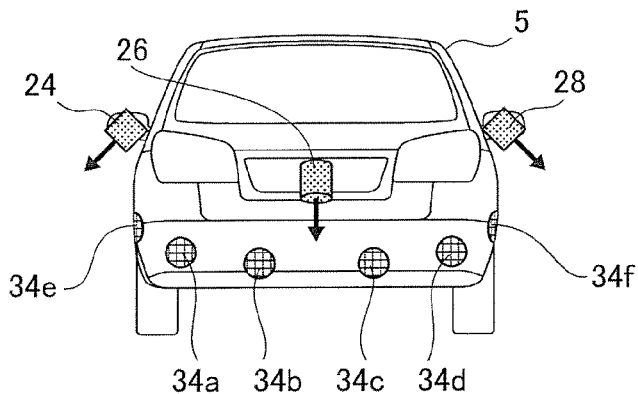
FIG. 2C is an external view showing a vehicle on which the vehicle start support device according to the first embodiment is mounted, wherein a rear view of the vehicle is shown.

The front camera 22 constituting the imagers 20 is mounted to be downward diagonally toward the front of the vehicle 5 on the forefront of the vehicle 5, as shown in FIGS. 2A to 2C. The front camera 22 has an angle of view of about 180 degrees. A part of the vehicle 5 and a road surface are displayed in an image imaged by the front camera 22.

The left side camera 24 is mounted to be downward diagonally toward a left side of the vehicle 5 on a left door mirror of the vehicle 5, as shown in FIGS. 2A to 2C. The left side camera 24 has an angle of view of about 180 degrees. A part of the vehicle 5 and a road surface are displayed in an image imaged by the left side camera 24.

The rear camera 26 is mounted on a rear door or trunk lid on a rear portion of the vehicle 5, as shown in FIGS. 2A to 2C. The rear camera 26 has an angle of view of about 180 degrees. A part of the vehicle 5 and a road surface are displayed in an image imaged by the rear camera 26.

The right side camera 28 is mounted to be downward diagonally toward a right side of the vehicle 5 on a right door mirror of the vehicle 5. The right side camera 28 has an angle of view of about 180 degrees. A part of the vehicle 5 and a road surface are displayed in an image imaged by the right side camera 28.

In addition, as shown in FIGS. 2A to 2C, twelve ultrasonic sensors 32a to 32f, 34a to 34f constituting the ranging sensor 30 are mounted on the vehicle 5.

The six ultrasonic sensors 32a to 32f are mounted on a front portion of the vehicle 5, as shown in FIGS. 2A and 2B.

Of the ultrasonic sensors 32a to 32f, the ultrasonic sensors 32a to 32d are mounted on a front bumper of the vehicle 5 to be positioned horizontally toward a front of the vehicle 5. The ultrasonic sensor 32e is mounted on a right side surface of the front bumper of the vehicle 5 to be positioned horizontally toward a right side of the vehicle 5. The ultrasonic sensor 32f is mounted on a left side surface of the front bumper of the vehicle 5 to be positioned horizontally toward a left side of the vehicle 5.

In addition, as shown in FIGS. 2B and 2C, the six ultrasonic sensors 34a to 34f are mounted on a rear portion of the vehicle 5.

Of these ultrasonic sensors, the ultrasonic sensors 34a to 34d are mounted on a rear bumper of the vehicle 5 to be positioned horizontally toward the rear of the vehicle 5. The ultrasonic sensor 34e is mounted on a left side surface of the rear bumper of the vehicle 5 to be positioned horizontally toward the left side surface of the vehicle 5. The ultrasonic sensor 34e is mounted on a right side surface of the rear bumper of the vehicle 5 to be positioned horizontally toward the right side surface of the vehicle 5.

[Description of Parking Style Handling with Vehicle Start Support Device]

Next, each of three types of parking styles handling with the vehicle start support device is described with reference to FIGS. 2A to 2C, 3A, 3B, 4A, 4B, 5A, and 5B.

Figure 3A:
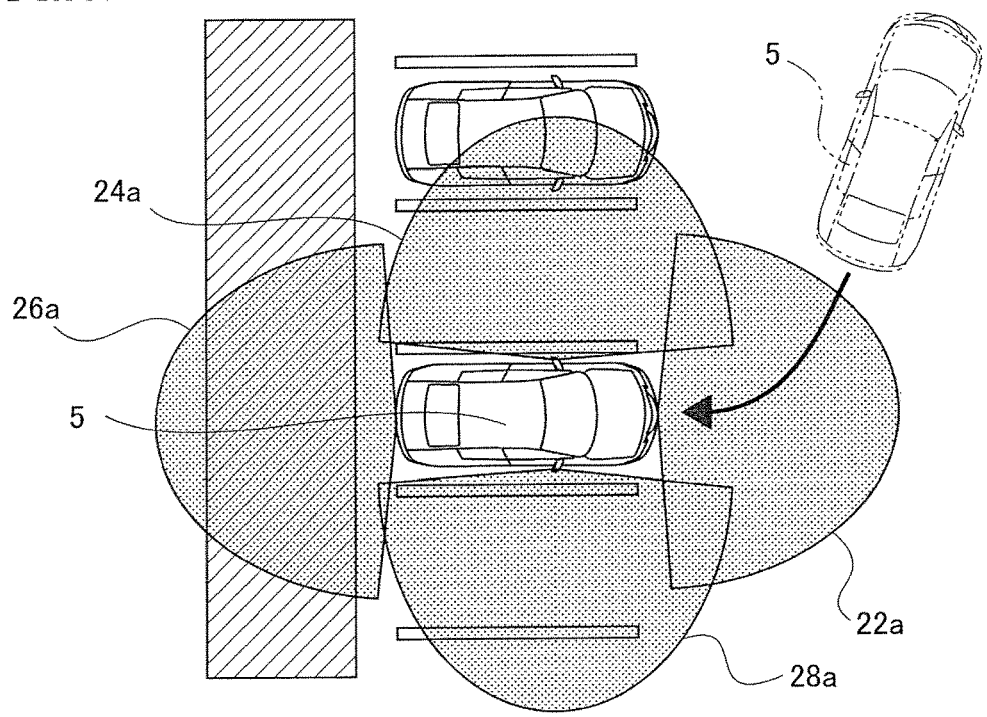
FIG. 3A is an explanatory view for explaining a perpendicular parking made with retreat in a parking style applied to the vehicle start support device according to the first embodiment of the present invention.
Figure 3B:
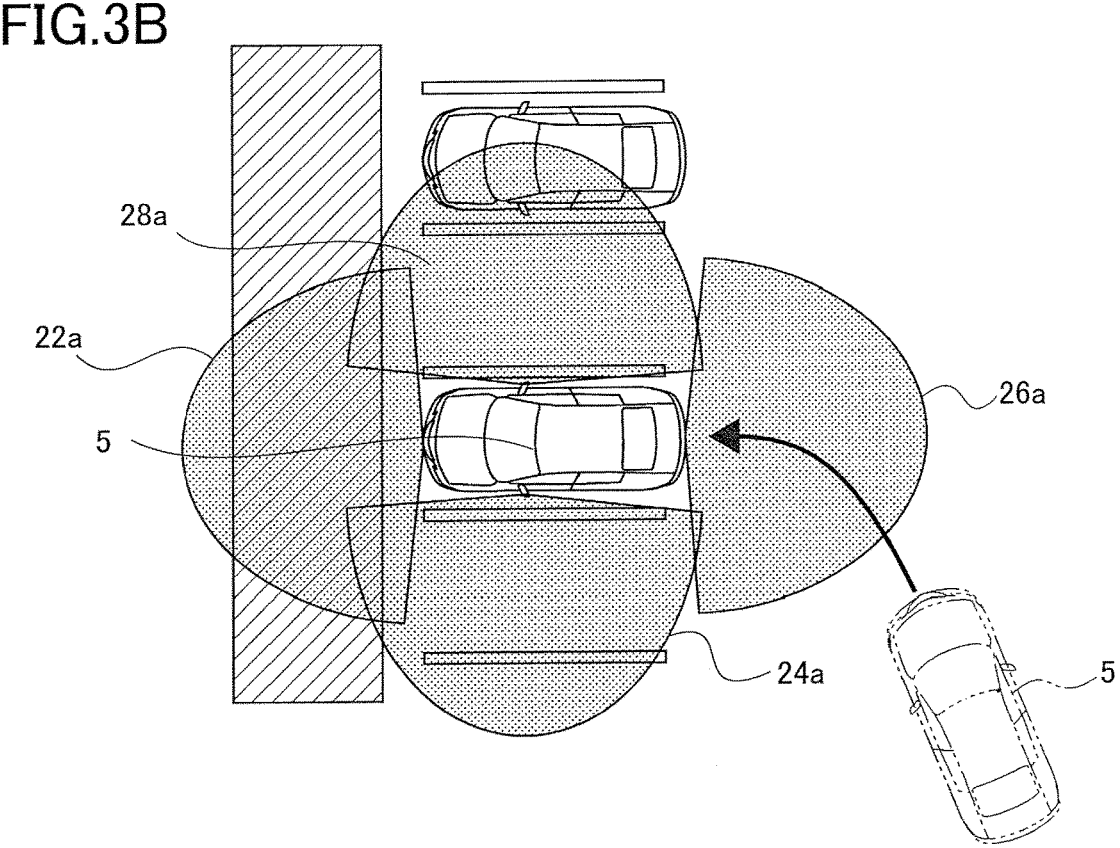
FIG. 3B is an explanatory view for explaining a perpendicular parking made with advance in the parking style applied to the vehicle start support device according to the first embodiment of the present invention.

FIGS. 3A and 3B illustrate a perpendicular parking in which vehicles are parked in parking frames side by side in a perpendicular direction to a side end of the road. In particular, FIG. 3A illustrates a state of a retreat perpendicular parking parked by the retreat of each of vehicles. FIG. 3B illustrates a state of an advance perpendicular parking parked by the advance of each of vehicles.

The imagers 20 (FIGS. 2A to 2C) mounted on each vehicles 5 parked in the retreat perpendicular parking image an area shown in FIG. 3A. That is to say, the front camera 22 (FIGS. 2A and 2B) images an imaging range 22a which is the front of the vehicle 5. The left side camera 24 (FIGS. 2A to 2C) images an imaging range 24a adjacent to the left side of the vehicle 5 in a direction of the parking frame. The rear camera 26 (FIGS. 2B and 2C) image an imaging range 26a which is the rear of the vehicle 5. The right side camera 28 (FIGS. 2A and 2C) images an imaging range 28a adjacent to a right side of the vehicle 5 in a direction of the parking frame.

The imagers 20 (FIGS. 2A to 2C) mounted on each of the vehicles parked with the advance perpendicular parking images an area shown in FIG. 3B. That is to say, the front camera 22 (FIGS. 2A and 2C) images the imaging range 22a which is frontward of the vehicle 5. The left side camera 24 (FIGS. 2A to 2C) images the imaging range 24a adjacent to the left side of the vehicle 5 in the direction of the parking frame. The rear camera 26 (FIGS. 2B and 2C) images the imaging range 26a which is rearward of the vehicle 5. The right side camera 28 (FIGS. 2A and 2C) images the imaging range 28a adjacent to the right side of the vehicle 5 in the direction of the parking frame.

Figure 4A:
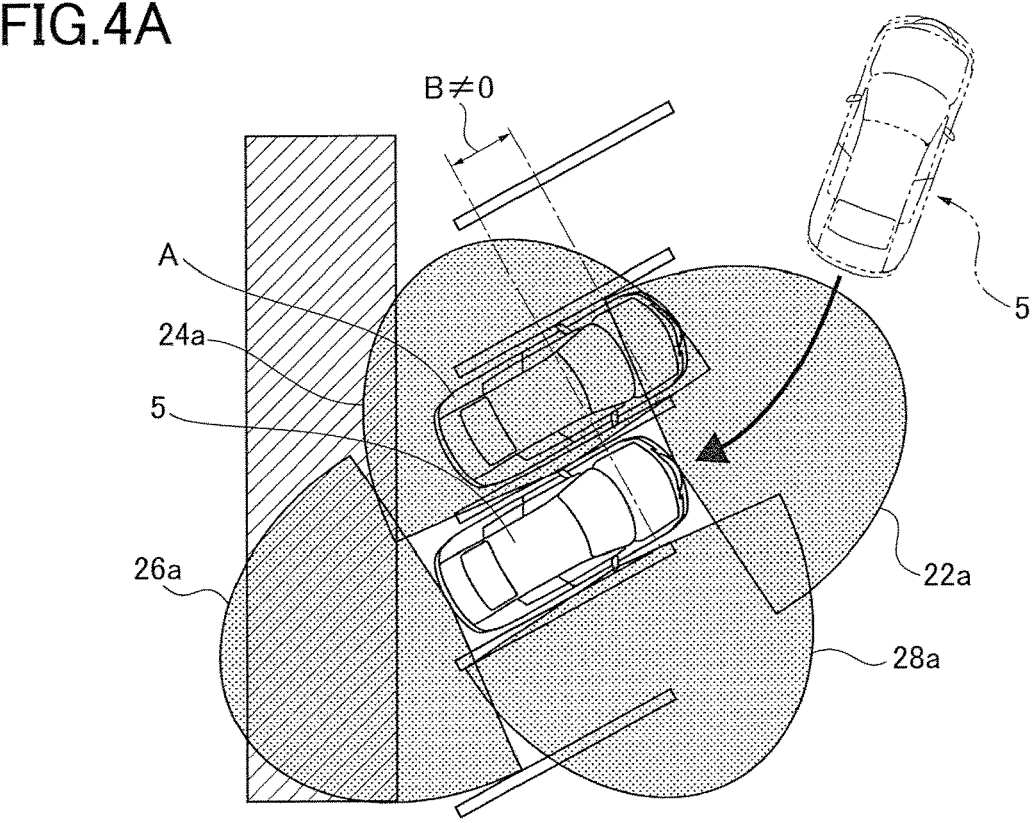
FIG. 4A is an explanatory view for explaining an angle parking made with retreat in the parking style applied to the vehicle start support device according to the first embodiment of the present invention.
Figure 4B:
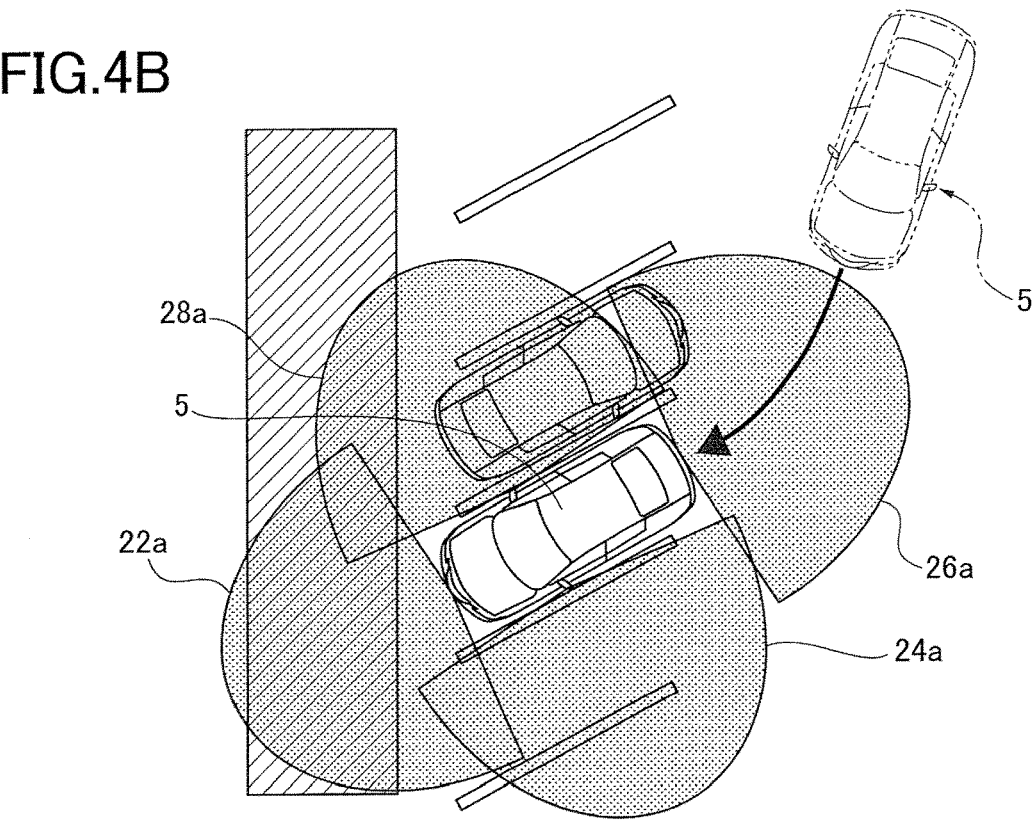
FIG. 4B is an explanatory view for explaining the angle parking made with advance in the parking style applied to the vehicle start support device according to the first embodiment of the present invention.

FIGS. 4A and 4B illustrate an angle parking in which vehicles are parked in parking frames in parking frames aligned in an angle direction to the side end of the road. In particular, FIG. 4A illustrates a state of a retreat angle parking performed by retreating the vehicle 5. FIG. 4B illustrates a state of an advance angle parking performed by advancing the vehicle 5.

Note that, to simplify the following description, a state angularly parking the vehicle 5 as shown in FIGS. 4A and 4B is defined as "angularly parked to angle leftward". If the parking frames shown in FIGS. 4A and 4B are drawn in a direction extending to a lower-right on a paper, this state is defined as "angularly parked to angle rightward".

The imagers 20 (FIGS. 2A to 2C) attached to the vehicle 5 parked in the retreat angle parking image areas shown in FIG. 4A. More specifically, the front camera 22 (FIGS. 2A and 2B) images the imaging range 22a in the front of the vehicle 5. The left side camera 24 (FIGS. 2A to 2C) images the imaging range 24a adjacent to the left side of the vehicle 5 in the direction of the parking frame. The rear camera 26 (FIGS. 2B and 2C) images the imaging range 26a in the rear of the vehicle 5. The right side camera 28 (FIGS. 2A and 2C) images the imaging range 28a adjacent to the right side of the vehicle 5 in the direction of the parking frame.

The imagers 20 (FIGS. 2A to 2C) attached to the vehicle 5 parked in the advance angle parking image areas shown in FIG. 4B. More specifically, the front camera 22 (FIGS. 2A and 2B) images the imaging range 22a in the front of the vehicle 5. The left side camera 24 (FIGS. 2A to 2C) images the imaging range 24a adjacent to the left side of the vehicle 5 in the direction of the parking frame. The rear camera 26 (FIGS. 2B and 2C) images the imaging range 26a in the rear of the vehicle 5. The right side camera 28 (FIGS. 2A and 2C) images the imaging range 28a adjacent to the right side of the vehicle 5 in the direction of the parking frame.

Figure 5A:
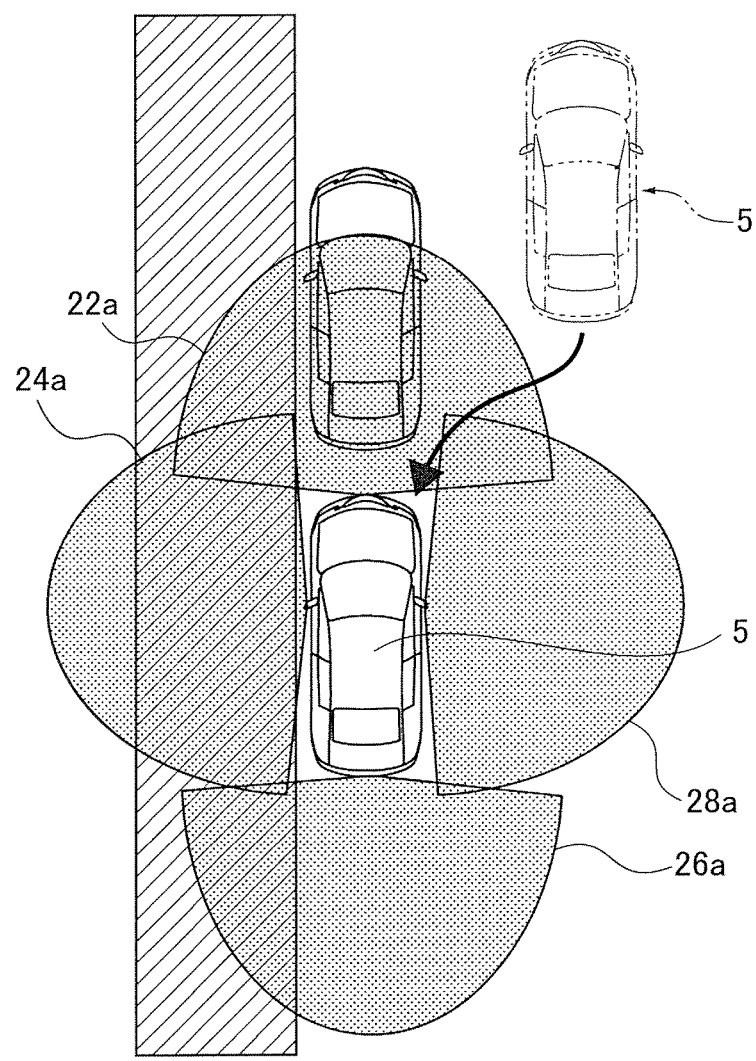
FIG. 5A is an explanatory view for explaining a leftward parallel parking in the parking style applied to the vehicle start support device according to the first embodiment of the present invention.
Figure 5B:
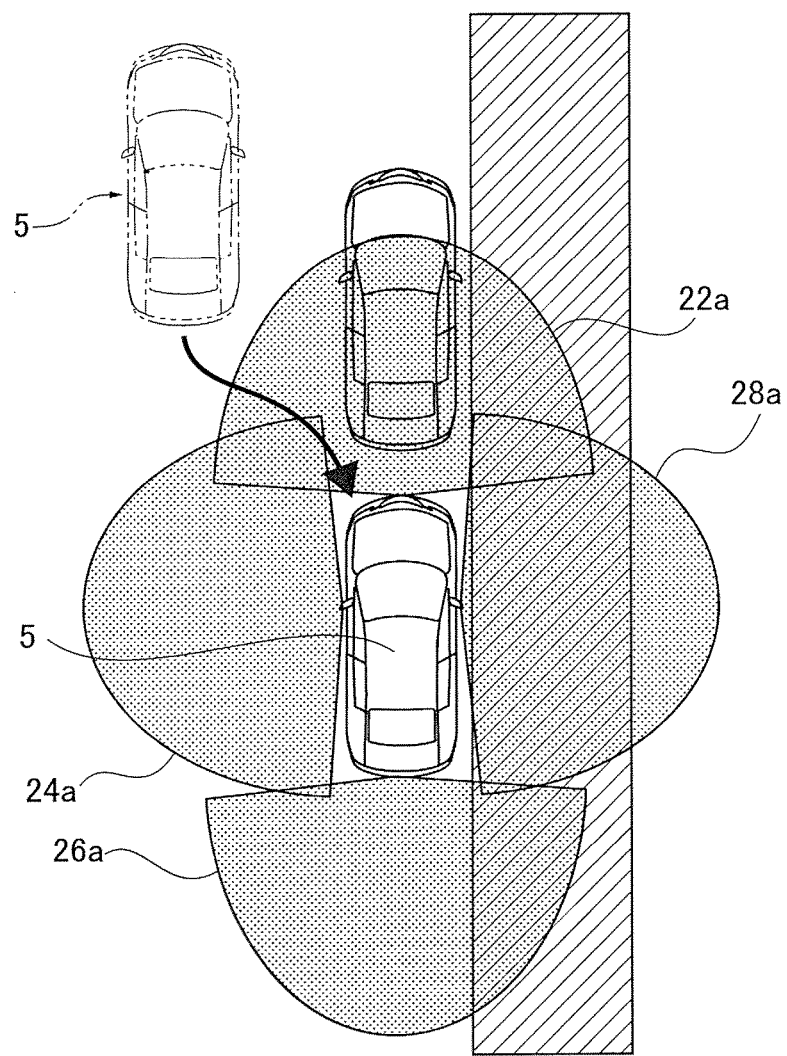
FIG. 5B is an explanatory view for explaining a rightward parallel parking in the parking style applied to the vehicle start support device according to the first embodiment of the present invention.

FIG. 5A and FIG. 5B illustrate a parallel parking that parks a vehicle in a tandem state. In particular, FIG. 5A illustrates a state of a left parallel parking in which a parallel parking is performed at a left end of a road. FIG. 5B illustrates a state of a right parallel parking in which a parallel parking is performed at a right end of the road.

At this time, the imagers 20 (FIGS. 2A to 2C) mounted on the vehicle 5 parked with the left parallel parking images areas shown in FIG. 5A. That is to say, the front camera 22 (FIGS. 2A and 2B) images the imaging range 22a of the front of the vehicle 5. The left side camera 24 (FIGS. 2A to 2C) images the imaging range 24a of a road end side of the vehicle 5. The rear camera 26 (FIGS. 2B and 2C) images the imaging range 26a of the rear of the vehicle 5. The right side camera 28 (FIGS. 2A and 2C) images the imaging range 28a of a roadway side of the vehicle 5.

On the other hand, the imagers 20 (FIGS. 2A to 2C) mounted on the vehicle 5 parked with the right parallel parking image areas shown in FIG. 5B. That is to say, the front camera 22 (FIGS. 2A and 2B) images the imaging range 22a of the front of the vehicle 5. The left side camera 24 (FIGS. 2A to 2C) images the imaging range 24a of the roadway side of the vehicle 5. The rear camera 26 (FIGS. 2B and 2C) images the imaging range 26a in the rear of the vehicle 5. The right side camera 28 (FIGS. 2A and 2C) images the imaging range 28a of the road end side of the vehicle 5.

The vehicle start support device 10 is usually used in a case of parking the vehicle 5 on a road. The vehicle start support device 10 handles the three types of parking forms as described above. In the parking style determiner 50 (FIG. 1) as described hereinafter, whether the vehicle is parked by either of the parking forms is determined. When it is determined that the parking does not correspond to either of the parking forms as described above, it is determined that the parking forms are not applied.

[Description of Entire Flow of Processing in Vehicle Start Support Device]

Next, the entire flow of processing executed in the vehicle start support device 10 is described with reference to FIGS. 1 and 6. Details of individual steps are described below.

(Step S10)

In the start operation detector 48, it is detected that a driver has executed operation to start the vehicle 5.

(Step S12)

In the vehicle surrounding state recognizer 46, the detection of parking frame lines, adjacent vehicles, obstacles other than vehicles, curbstones or roadsides of the surroundings of the vehicle 5 is executed.

(Step S14)

In the parking style determiner 50, the parking form set in parking at a position where the vehicle 5 parks is determined.

(Step S16)

In the monitoring area setter 52, a monitoring area to which the driver should pay attention when starting the vehicle 5 is set.

(Step S18)

In the vehicle surrounding state provider 54, information provision such as displaying an object approaching the vehicle 5 or image as imaged with respect to the monitoring area set in step S18 is performed to the driver of the vehicle 5.

(Step S20)

In the information provision end determiner 56, by determining whether the information provision from the vehicle surrounding state provider 54 should be completed, when it is determined that it should be completed, the information provision is completed.

A content of the details of the processing executed in each of steps as shown in FIG. 6 is sequentially described with reference to FIG. 1.

[Description of Start Operation Detecting Processing]

In the start operation detector 48, whether an ignition switch (not shown) of the vehicle 5 is ON is determined. When it is detected that the ignition switch is ON, in other words, an engine of the vehicle 5 is started, then, by referring to a signal from a shift position sensor (not shown), whether a shift position of the vehicle 5 is in a D-range (drive) or an R-range (reverse) is determined. When it is determined that the shift position of the vehicle 5 is in the D-range (drive) or the R-range (reverse), the driver determines that there is a possibility of starting the vehicle 5.

Note that it is possible to enhance prediction accuracy in starting the vehicle 5 by determining that there is a possibility of starting the vehicle 5 when a parking brake is released, together with the conditions as described above.

[Description of Recognition Processing of Vehicle Surrounding State]

Figure 7A:
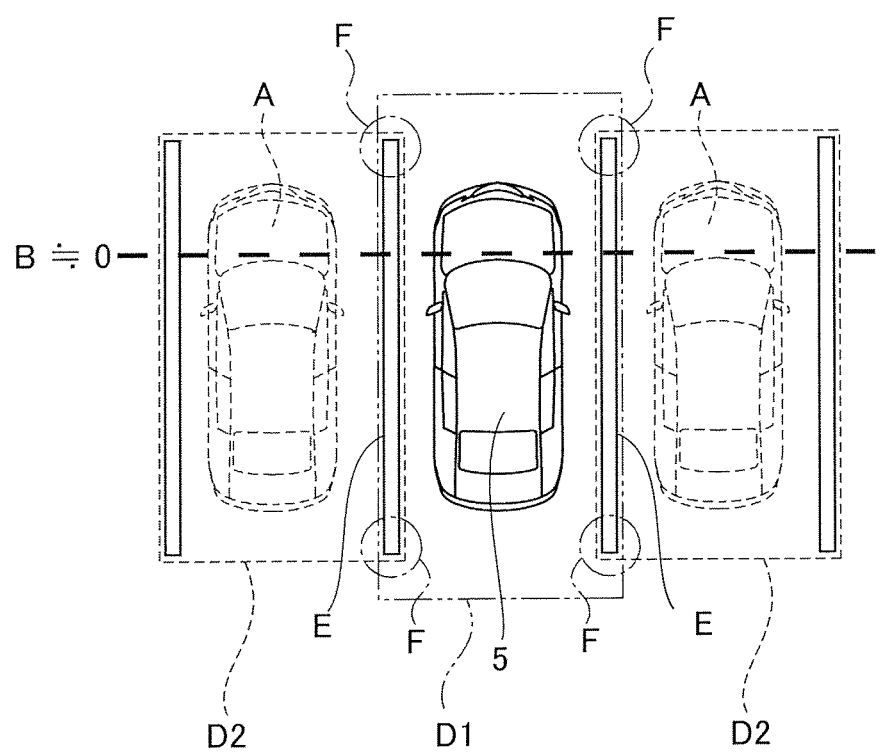
FIG. 7A is a first explanatory view for explaining a concrete example of parameter using for determination of the parking style in the vehicle start support device according to the first embodiment of the present invention.
Figure 7B:
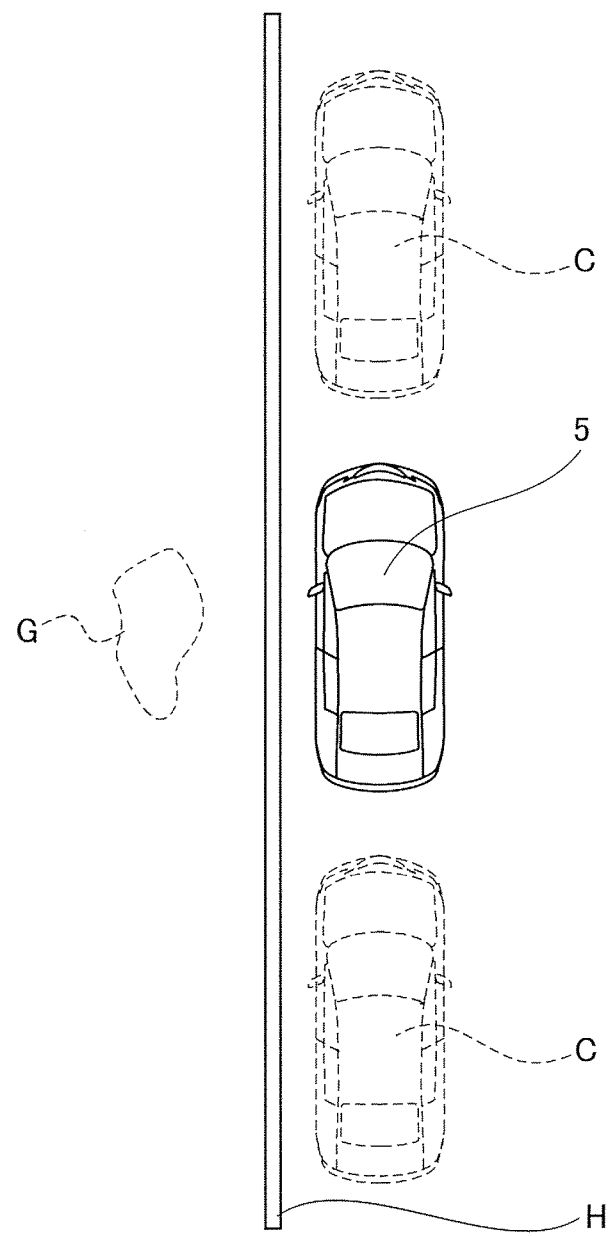
FIG. 7B is a second explanatory view for explaining a concrete example of parameter using for determination of the parking style in the vehicle start support device according to the first embodiment of the present invention.

In the vehicle surrounding state recognizer 46, circumstances of the surroundings of the vehicle are recognized by using the images imaged by the imagers 20, and distance data measured by the ranging sensor 30. Concretely, the detection of objects or feature quantities is executed, as shown in FIGS. 7A and 7B. A method of recognizing the objects or the feature quantities for every each object and feature quantity is described hereinafter.

<Recognition of Parking Frame Lines>

FIG. 7A illustrates a state where the perpendicular parking of the vehicle 5 is executed in the parking frame. At this time, in the vehicle surrounding state recognizer 46, the position of a parking frame line which is a border line representing the parking frame is detected. Concretely, right and left parking frame lines E constituting the parking frame D1 in which the vehicle 5 is parked and parking frames D2 each having a rectangular shape arranged rightward and leftward adjacent to the vehicle 5 are detected.

Various methods of detecting the parking frame lines E or the parking frames D1, D2 from an image as imaged are proposed. Any one of the proposed methods may be used.

For example, a plurality of images imaged by the imagers 20 are synthesized by executing coordinate transformation as looked down from above to generate an overhead image including the vehicle 5 and edge components having a parallel direction to a forward and rearward of the vehicle 5 is detected from the overhead image. Thus, in consideration of the constraint condition that the parking frames D1 and D2 have the rectangular shapes, a pair of edge components which exist at predetermined intervals corresponding to a lateral width of each of the parking frames D1, D2 are extracted from the detected edge components.

In this way, of the extracted edge components, the pair of edge components extracted at positions proximate to right and left both sides of the vehicle 5 can be detected as right and left parking frame lines E constituting the parking frame D in which the vehicle 5 is parked. In addition, a pair of edge components extending in the forward and rearward direction of the vehicle 5 detected at the left side or the right side of the vehicle 5 can be detected as the rectangular parking frames D2 adjacent to the right and the left of the vehicle 5.

<Recognition of End Positions of Parking Frame>

Endpoint positions F of the parking frame lines E are detected based on the detection result of the right and left parking frame lines E constituting the parking frame D1 in which the vehicle 5 is parked.

Concretely, of both endpoints of the parking frame lines E detected at positions proximate to the right and left side of the vehicle 5, the endpoint positions F can be acquired by obtaining coordinates of two endpoints of the front side of the vehicle 5 or two endpoints of the rear side of the vehicle 5.

<Recognition of Positions of Right and Left Adjacent Vehicles>

Adjacent vehicles A that stop at a right side and a left side of the vehicle 5 are detected.

Concretely, of the plurality of images imaged by the imagers 20, presence and absence and a position of a tire of each of the vehicles are detected from images imaged by the left side camera 24 (see FIG. 2A) and the right side camera 28 (see FIG. 2A). The tire of the vehicle can model as an area of a black donut-like shape. Therefore, for example, it is possible to detect the tire by using a template matching that allows magnification and reduction or perspective deformation. When the fore and rear tires are detected, it is determined that the adjacent vehicles A exist at the left side and the right side of the vehicle 5

Moreover, at this time, a front and rear deviation quantity B of the vehicle 5 and the adjacent vehicles A is also detected. The front and rear deviation quantity B is a deviation quantity in a front-rear direction between the vehicle 5 and the adjacent vehicles A. For example, in the perpendicular parking shown in FIG. 7A, the vehicle 5 and the right and left adjacent vehicles A, A are parked without having a deviation quantity in the front-rear direction. Therefore, the front and rear deviation quantity B is about zero.

The deviation quantity can be calculated, for example, based on the positions of the tires of the adjacent vehicles as previously detected. More specifically, a front and rear position between the vehicle 5 and the left adjacent vehicle A can be estimated based on a position of either one tire of the front and rear tires of the left adjacent vehicle A detected from the image imaged by the left side camera 24. In addition, a front and rear position between the vehicle 5 and the right adjacent vehicle A can be estimated based on a position of either one tire of the front and rear tires of the right adjacent vehicle A detected from the image imaged by the right side camera 28.

Concretely, a relationship between the position of the tire detected from the image imaged by the left side camera 24 or the right side camera 28 and at this time the front and rear deviation quantity B between the vehicle 5 and the adjacent vehicles A can be previously obtained by an experiment. The front and rear deviation quantity B can be calculated by storing data obtained by the experiment as a table and applying the detected tire position to the table.

The front and rear deviation quantity B varies in accordance with the parking state of the adjacent vehicles A. For example, in the example of the angle parking shown in FIG. 4A, the front and rear deviation quantity B is not 0. In other words, it is determined that the parking position of the left adjacent vehicle A deviates to be forwarder than that of the vehicle 5.

Here, when detecting the adjacent vehicles A and the front and rear deviation quantity B, by using the distance data measured by the ultrasonic sensors 32e, 32f, 34e, and 34f (see FIGS. 2B and 2C) attached to the vehicle 5 toward the side of the vehicle in the ranging sensor 30, the detection accuracy in the adjacent vehicles A and the front and rear deviation quantity B may be improved.

<Recognition of Front and Rear Adjacent Vehicles>

FIG. 7B illustrates a state where the vehicle 5 is parked in the parallel parking at the left end of the road. At this time, in the vehicle surrounding state recognizer 46, adjacent vehicles C stopped adjacent to the front and the rear of the vehicle 5 are detected.

Concretely, number plates are detected from the image imaged by the front camera 22 and the image imaged by the rear camera 26. When the number plates are detected, it is determined that the adjacent vehicles C exist in the front and the rear of the vehicle 5

At this time, the detection accuracy in the adjacent vehicles A and the front and rear deviation quantity B may be improved by using the distance data measured by the ultrasonic sensors 32e, 32f, 34e, and 34f (see the upper and middle portions in FIG. 2) attached to the vehicle 5 toward the side of the vehicle in the ranging sensor 30.

<Recognition of Obstacle Other than Vehicle>

An obstacle G other than a vehicle existing at the right and the left of the vehicle 5 is detected, as shown in FIG. 7B.

Concretely, the tires are first detected as described above from the images imaged by the left side camera 24 and the right side camera 28. When the tires are detected, it is determined that a vehicle parks at a side of the vehicle 5, and position detection processing of the foregoing adjacent vehicles is executed. On the other hand, when the tires cannot be detected, for example, an overhead image including the vehicle 5 is generated from the plurality of images imaged by the imagers 20.

If an object having a height from the road surface exists, an edge component constituting the object in the height direction, in the generated overhead image is transformed into edge components radially expanding from the position of the vehicle 5. Accordingly, it is recognized that the obstacle G having a height from the road surface, other than the vehicle exists in an area(s) which is placed between the plurality of radial edge components by detecting the edge components radially expanding from the overhead image.

At this time, the detection accuracy in the obstacle G may be improved by using the distance data measured by the ultrasonic sensors 32e, 32f, 34e, and 34f (see the upper portion and the middle portion in FIG. 2) attached to the vehicle 5 toward the side of the vehicle in the ranging sensor 30.

<Recognition of Curbstone and Roadside>

A roadside portion H shown in FIG. 7B is detected. The roadside portion H includes a case having a curbstone-shaped protrusion and a case having a paint representing a roadside.

Such a roadside portion H can be detected by use of the two detection processing of each of the parking frame lines E and the parking frames D1 and D2, for example. For example, after the edge components are detected from the overhead image including the vehicle 5, of the detected edge components, an edge component extending long along the forward and reward direction of the vehicle 5 in a left proximate position and a right proximate position of the vehicle 5 can be detected as the roadside portion H.

Note that the content of the series of vehicle surrounding state recognition processing as described above is one example, it is not limited to the processing method as described above. If there is a recognition method having the similar operation, it can be applied.

[Description of Parking Style Determination Processing]

In the parking style determiner 50, the parking style performed at the time when the vehicle 5 is parked at the present position is determined. At this time, the objects or the feature quantities detected in the vehicle surrounding state recognizer 46 are used.

FIG. 8 illustrates a list of the objects and feature quantities in the surrounding of the vehicle 5 necessary to determine each parking style. The list shows that it is required to use the objects and feature quantities shown in rows to determine the parking types shown in columns. Note that the objects and feature quantities shown in the rows are detected by the foregoing vehicle surrounding state recognition processing.

Figure 9:
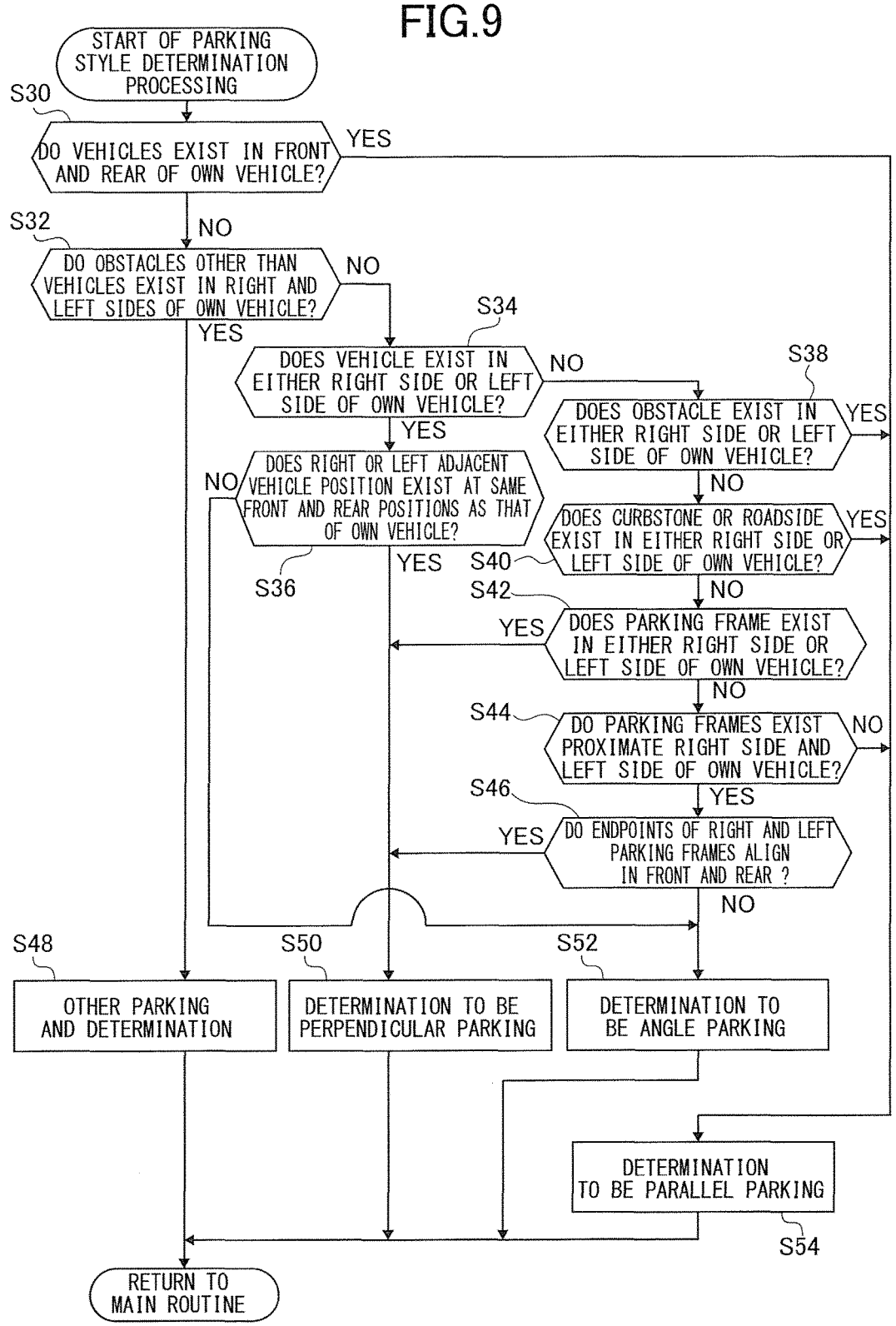
FIG. 9 is a flow chart showing a flow of parking style determination processing in the vehicle start support device according to the first embodiment of the present invention.

To execute efficiently the determination depicted in FIG. 8 comprehensively, parking style determination processing is executed in the parking style determiner 50 based on a flow chart shown in FIG. 9. A flow of processing shown in the flow chart shown in FIG. 9 is described hereinafter.

(Step S30)

The closest adjacent vehicle C exists in the front of the vehicle 5 and whether the adjacent vehicle C exists at the closest rearward position to the vehicle 5 is determined. Concretely, it is determined by executing the detection processing of the adjacent vehicle C as described above. As a result of the detection, if the conditions are satisfied (when the adjacent vehicles exist at the front and the rear of the vehicle 5), the flow proceeds to step S54, if the conditions are not satisfied, the flow proceeds to step S32.

(Step S32)

Whether an obstacle G other than the vehicle exists on the right and left both sides of the vehicle 5 is determined. Concretely, it is determined by executing the detection processing of the obstacle G other than the vehicle as described above. As a result of the determination, when the condition is satisfied (the obstacle G exists on the both sides of the vehicle 5), the flow proceeds to step S48, when the condition is not satisfied, the flow proceeds to step S34.

(Step S34)

Whether the adjacent vehicle A exists on either one of the right and left both sides of the vehicle 5 is determined. Concretely, it is determined by executing the detection processing of the adjacent vehicle A as described above. As a result of the determination, when the condition is satisfied (when the adjacent vehicle A exists in an either side of the vehicle 5), the flow proceeds to step S36, when the condition is not satisfied, the flow proceeds to step S38.

(Step S36)

By obtaining a deviation quantity B in a forward and rearward position between the vehicle 5 and the adjacent vehicle A that exists in either the right side or the left side of the vehicle 5, whether the vehicle 5 and the adjacent vehicle A are positioned at the same forward and rearward position is determined. Concretely, it is determined by executing the detection processing of the forward and rearward deviation quantity B as described above. As a result of the determination, when the condition is satisfied (when the vehicle 5 and the adjacent vehicle A are in the same forward and rearward position), it is determined that they are a state of the perpendicular parking, the flow proceeds to step S50, when the condition is not satisfied (when the vehicle 5 and the adjacent vehicle A deviate in the front and rear direction), it is determined that they are in a state of the angle parking, the flow proceeds to step S52.

Here, in step S36, the direction of the vehicle 5 which is in the angle parking (angle parking inclining to the left or angle parking inclining to the right) can be determined by determining signs of the forward and rearward deviation quantity B (the adjacent vehicles A deviate in the forward side or rearward side of the vehicle 5. This information is stored in the parking style determiner 50 to use it later.

(Step S38)

Whether the obstacle G other than the vehicle exists in either the right or the left of the vehicle 5 is determined. Concretely, it is determined by executing the detection processing of the obstacle G other than the vehicle, as described above. As a result of the detection, when the condition is satisfied (when the obstacle G exists in either one of the right and the left of the vehicle 5), the flow proceeds to step S54, when the condition is not satisfied, the flow proceeds to step S40.

(Step S40)

Whether the curbstone or the roadside exists in either the right or the left of the vehicle 5 is determined. Concretely, it is determined by executing the detection processing of the roadside position H, as described above. As a result of the detection, when the condition is satisfied (when the curbstone or the roadside exists in either one of the right and the left of the vehicle 5), the flow proceeds to step S54, when the condition is not satisfied, the flow proceeds to step S42.

(Step S42)

Whether the parking frame D exists in either the right or the left of the vehicle 5 is determined. Concretely, it is determined by executing the detection processing of the parking frames adjacent to the right and the left of the vehicle 5, as described above. As a result of the detection, when the condition is satisfied (when the parking frame D exists in either one of the right and the left of the vehicle 5), the flow proceeds to step S50, when the condition is not satisfied, the flow proceeds to step S44.

(Step S44)

Whether the parking frame lines E exists proximately the right and the left of the vehicle 5 is determined. Concretely, it is determined by executing the detection processing of the right and left parking frame lines E constituting the parking frame D1 in which the vehicle 5 is parking, as described above. As a result of the detection, when the condition is satisfied (the parking frame lines E exists proximately the right and the left of the vehicle 5), the flow proceeds to step S46, and when the condition is not satisfied, the flow proceeds to step S54.

(Step S46)

Whether the endpoint positions F of the right and left frame lines E constituting the parking frame D1 in which the vehicle 5 is parking align with the right and the left is determined. Concretely, a deviation quantity between the right and left endpoint positions F of the vehicle 5 is evaluated similarly to the evaluation of the forward and rearward deviation quantity B by executing the detection of the endpoint positions F of the parking fame lines E. As a result of the determination, when the condition is satisfied (the endpoint positions of the right and left frame lines are the same position forward and rearward), it is determined that the vehicle is the state of the perpendicular parking, and the flow proceeds to step S50, and when the condition is not satisfied (when the endpoint positions of the right and left frame lines deviate forward and rearward), it is determined that the vehicles are the state of the angle parking, and the flow proceeds to step S52.

Here, in step S46, by comparing the endpoint positions F of the right and left parking frame lines E, whether the endpoint position of the parking frame line E of either side of the right and the left deviates to either the forward position or the rearward position of the vehicle 5 is determined. Accordingly, the direction (the vehicle in the angle parking inclines leftward or rightward) of the vehicle 5 which is in the state of the angle parking can be determined. The information is stored in the parking style determiner 50 to use for monitoring area setting processing executed later.

(Step S48)

It is determined that the vehicle 5 executes the parking in a style which does not correspond to either of the perpendicular parking, the angle parking and the parallel parking, and is parked at a current position, the parking style determination processing is completed.

(Step S50)

It is determined that the vehicle 5 executes the perpendicular parking and is parked at the current position, and the parking style determination processing is completed.

(Step S52)

It is determined that the vehicle 5 executes the angle parking and is parked at the current position, and the parking style determination processing is completed.

(Step S54)

It is determined that the vehicle 5 executes the parallel parking and is parked at the current position, and the parking style determination processing is completed.

Note that, to realize the processing shown in FIG. 9, vehicle surrounding state recognition processing that detects each time the corresponding objects or feature quantities in each step in FIG. 9 may be executed, or the parking style may be determined by executing previously the entire vehicle surrounding state recognition processing and storing the detection result, and referring to the stored detection result while applying the detection result to the flow chart shown in FIG. 9.

[Description of Monitoring Area Setting Processing]

In the monitoring area setter 52, when starting the vehicle 5 based on the determination result of the parking style determiner 50, a monitoring area K which is an area where a driver should pay attention is set.

FIG. 10 illustrates a setting example of the monitoring area K depending on the parking style. When it is recognized that the corresponding parking style shown in columns of FIG. 10 is detected and whether a shift position of the vehicle 5 is a drive position (D range) or a reverse position (D range) is recognized in the start operation detector 48, a direction where sign ○ is attached is set to the monitoring area K.

An Area where sign Δ is attached is set to the monitoring area K if the adjacent vehicle does not exist in the area or the direction faces a road way.

Here, drawing numbers described in FIG. 10 illustrate drawings each showing a concrete example in setting the monitoring area in the corresponding place.

A method of setting the monitoring area is described hereinafter by use of a concrete example.

<Setting Example of Monitoring Area on Perpendicular Parking>

Figure 11A:
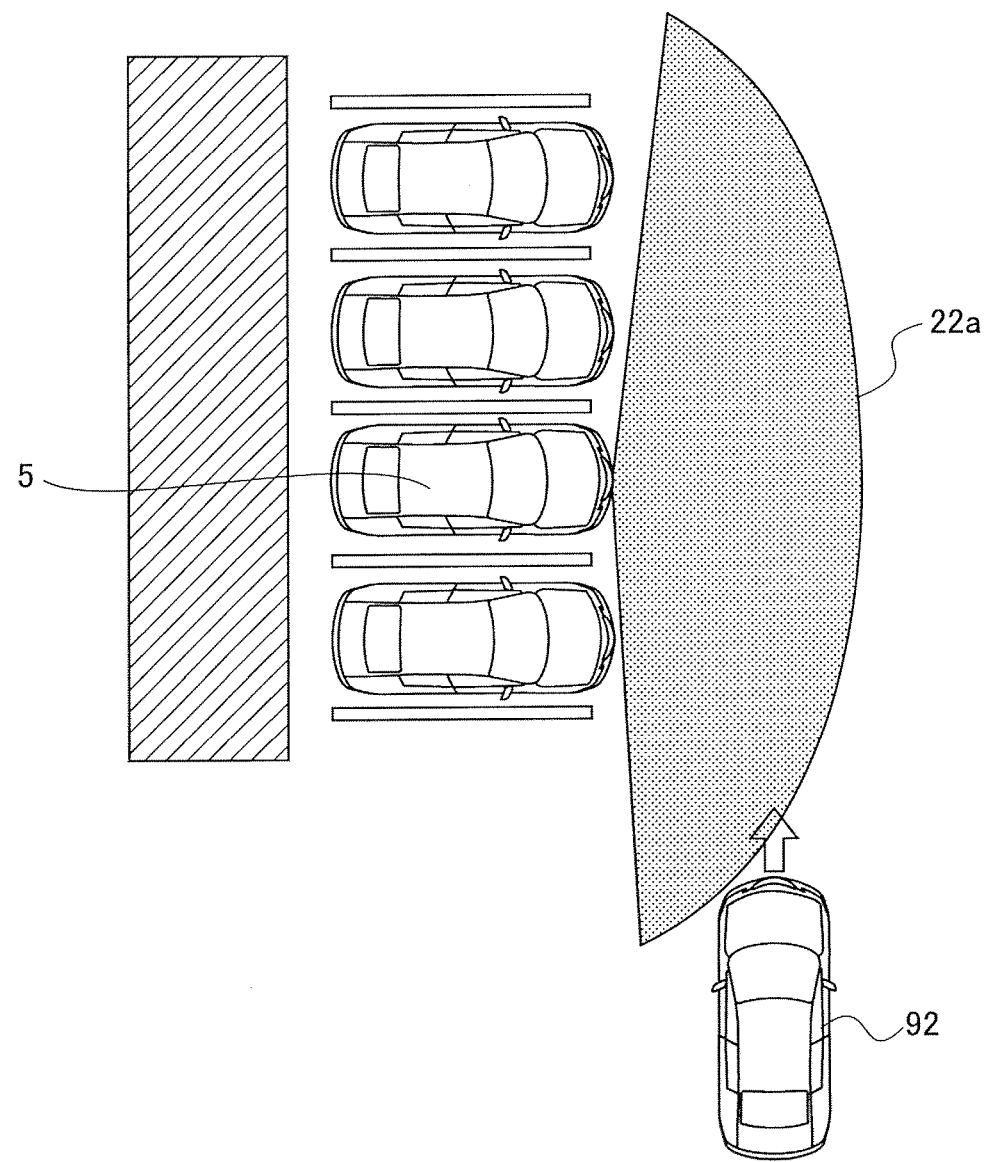
FIG. 11A is an explanatory view explaining a setting state of a monitoring area in starting from a state of the perpendicular parking with the advance state in the vehicle start support device according to the first embodiment of the present invention.

FIG. 11A illustrates a state where the perpendicular parking of the vehicle 5 is executed by the retreat and the vehicle is going to start by placing the shift position in the drive position.

At this time, it is determined that the vehicle 5 is the perpendicular parking by the parking style determination processing. Then, because the shift position is the drive position, it is recognized that the vehicle 5 is started in the state of the drive position, and the imaging range 22a of the front camera 22 (not shown) is set to the monitoring area K. Because the imaging range 22a of the front camera (not shown) has an angle of view of about 180 degrees, the set monitoring area K covers a supposed advancing direction of the starting vehicle 5 securely. In addition, for example, it is possible to catch a moving vehicle 92 approaching a side of the vehicle 5 in the monitoring area K.

Figure 11B:
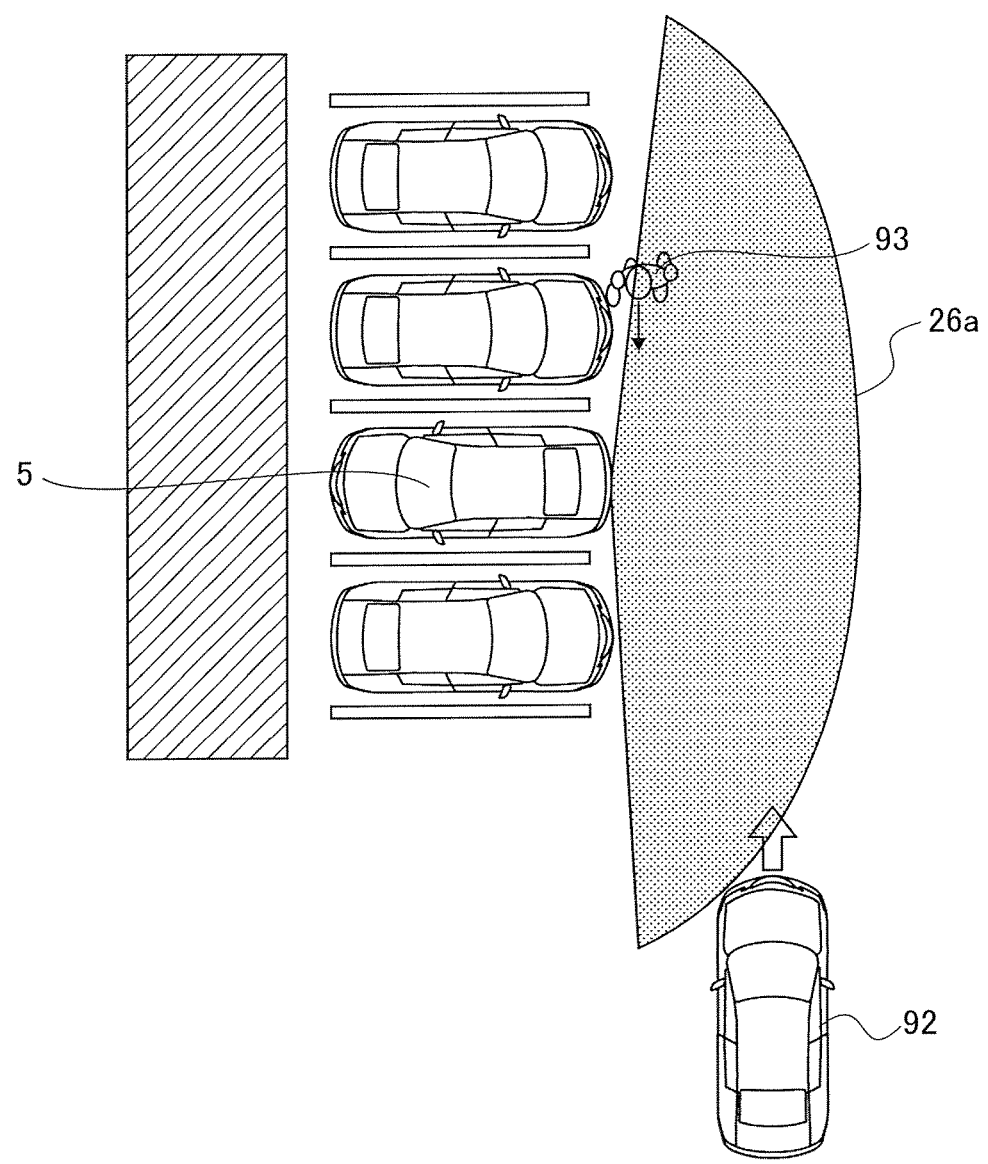
FIG. 11B is an explanatory view explaining a setting state of a monitoring area in starting from a state of the perpendicular parking with the retreat state in the vehicle start support device according to the first embodiment of the present invention.

Next, FIG. 11B illustrates a state where the vehicle 5 which is parked in the perpendicular parking by the advance is going to start by setting the shift position in the reverse position.

At this time, by the foregoing parking style determination processing, it is determined that the vehicle 5 is the perpendicular parking. Then, because the shift position is in the reverse position, it is recognized that the vehicle 5 is started in the retreat state, and the imaging range 26a of the rear camera 26 (not shown) is set to the monitoring area K. Because the imaging range 26a of the rear camera (not shown) has an angle of view of about 180 degrees, the set monitoring area K covers a supposed advancing direction of the starting vehicle 5 securely. In addition, for example, it is possible to catch a moving vehicle 92 or a walker 93 approaching a side of the vehicle 5 in the monitoring area K.

<Setting Example of Monitoring Area on Angle Parking>

Figure 12A:
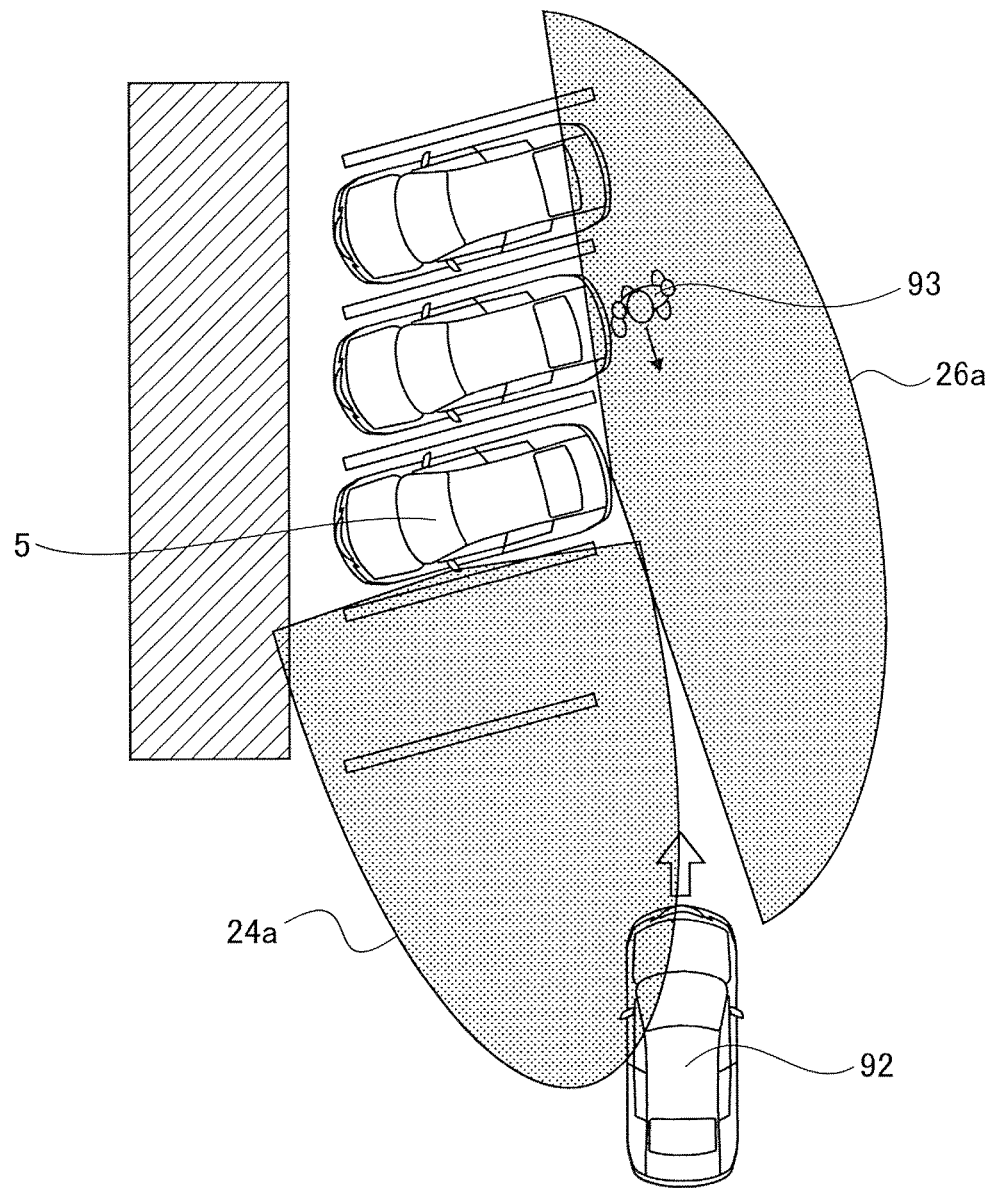
FIG. 12A is an explanatory view explaining a setting state of a monitoring area set when other vehicle is not parked in a left side of an own vehicle in starting from a state of the angle parking with the retreat state in the vehicle start support device according to the first embodiment of the present invention.

FIG. 12 illustrates a state where the vehicle 5 parked in the angle parking by the advance is going to start by placing the shift position in the reverse position.

At this time, by the foregoing parking style determination processing, it is determined that the vehicle 5 is the angle parking. Then, because the shift position is in the reverse position, it is recognized that the vehicle 5 is started in the state of the reverse position, and the imaging range 26a of the rear camera 26 (not shown) corresponding to the advance direction of the vehicle 5 is set to the monitoring area K.

Moreover, by the foregoing vehicle surrounding state recognition processing, it is determined that the adjacent vehicle A does not exist at the left side of the vehicle 5. Therefore, the imaging range 24a of the left side camera 24 (not shown) is also set in the monitoring area K.

Figure 12B:
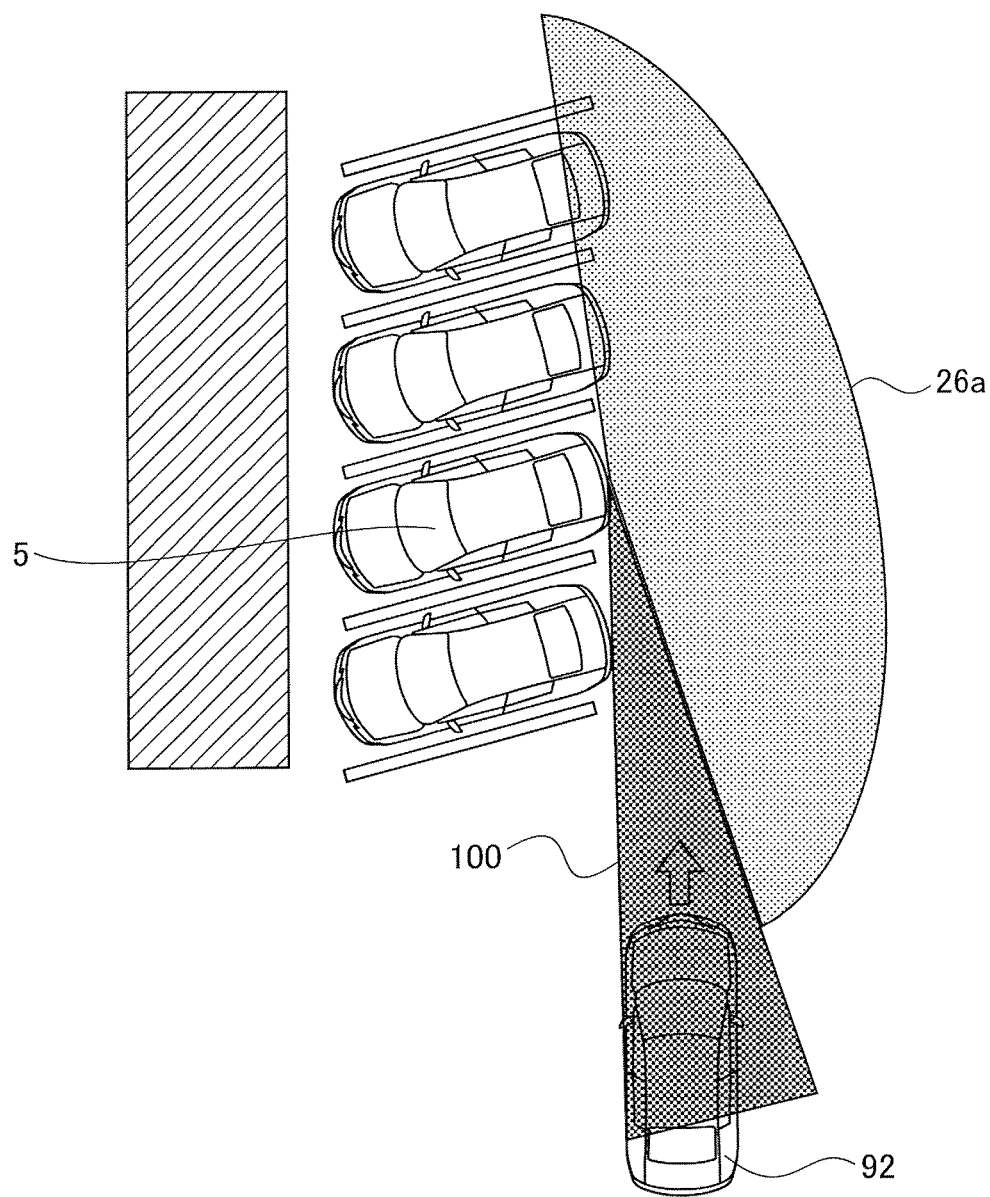
FIG. 12B is an explanatory view explaining a setting state of a monitoring area set when the other vehicle is parked in the left side of the own vehicle in starting from the state of the angle parking with the retreat state in the vehicle start support device according to the first embodiment of the present invention.

Next, FIG. 12B illustrates a state where the vehicle 5 parked in the angle parking by the advance is going to start by placing the shift position in the reverse position.

At this time, by the foregoing parking style determination processing, it is determined that the vehicle 5 is the angle parking. Then, because the shift position is in the reverse position, it is recognized that the vehicle 5 is started in the retreat state, and the imaging range 26a of the rear camera 26 (not shown) corresponding to the advance direction of the vehicle 5 is set to the monitoring area K.

At this time, the imaging range 26a of the rear camera 26 (not shown) has an angle of view of about 180 degrees, but because the vehicle 5 is the angularly parked state, it is not possible to sufficiently monitor the side of the vehicle 5. In other words, the set monitoring area K cannot cover securely a supported advance direction of the started vehicle. Therefore, an area (dead area 100) out of the imaging range 26a of the rear camera 26 (not shown) occurs. As a result, for example, it is not possible to catch the moving vehicle 92 approaching a side of the vehicle 5 in the monitoring area K.

Furthermore, when the vehicle is in the state of FIG. 12B, by the foregoing detection processing of the adjacent vehicles A, it is detected that the adjacent vehicles A exist on the right and the left of the of the vehicle 5. Accordingly, even if the left side camera 24 and the right side camera 28 (which are not shown) are actuated, the right and left adjacent vehicles are only imaged. Therefore, the left side camera and the right side camera do not function.

Accordingly, when being in the state of FIG. 12B, the dead area 100 occurs in the set monitoring area K.

Here, it is determined that the vehicle 5 parks angularly in either the right or the left in the angle parking from the deviation quantity of the endpoint positions F of the right and left parking frame lines E constituting the parking frame D1 in which the vehicle 5 parks, as shown in FIG. 7A. That is to say, in the example shown in FIG. 12B, it is determined that the vehicle 5 parks angularly to incline leftward. Therefore, it is predicted that the dead area 100 out of the imaging range 26a of the rear camera 26 in the left side of the vehicle 5 occurs. Accordingly, in this case, attention can be given to a driver that the dead area 100 exists in the set monitoring area K, as described below.

<Setting Example of Monitoring Area in Parallel Parking>

Figure 13A:
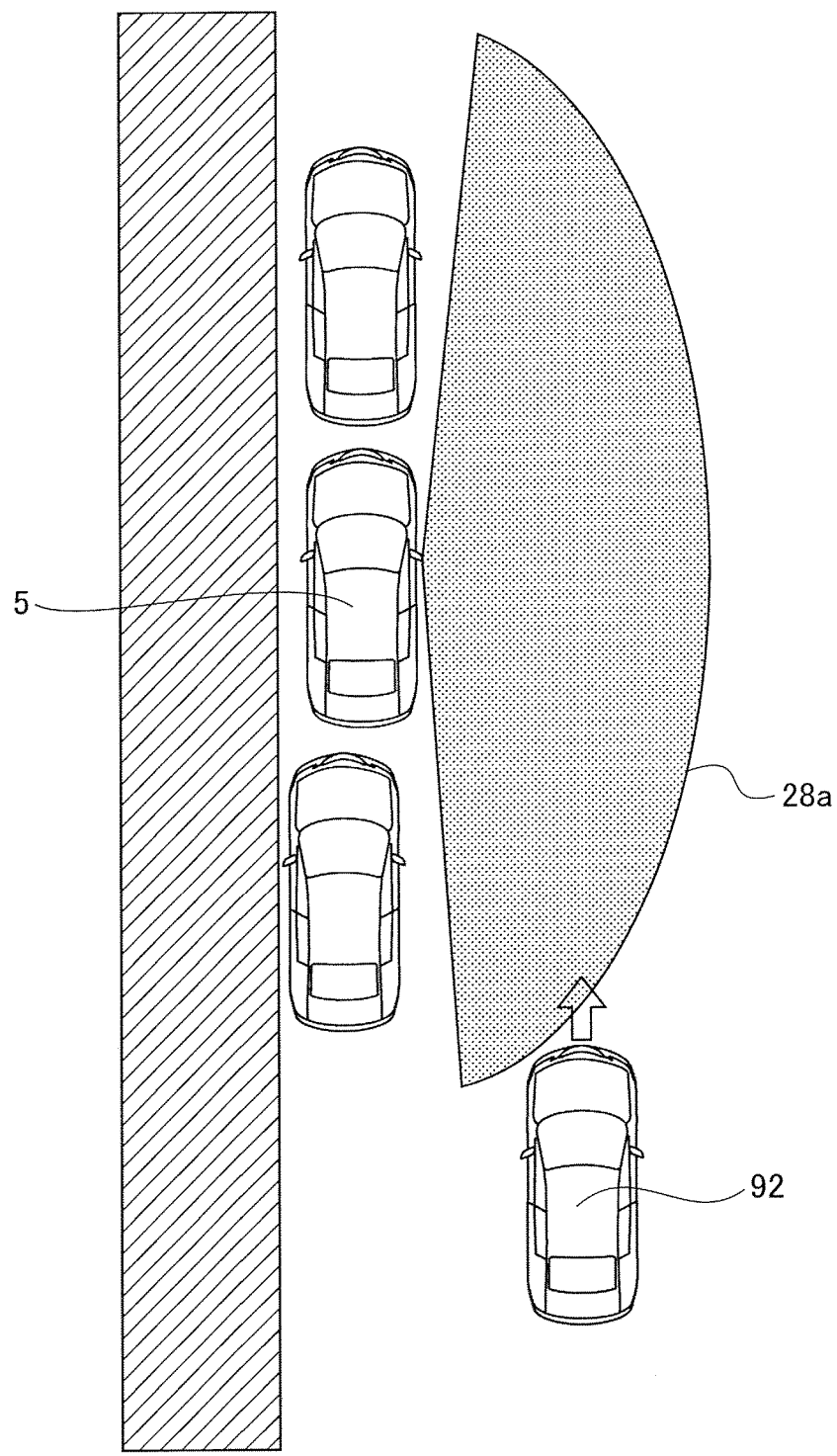
FIG. 13A is an explanatory view explaining a setting state of a monitoring area set in starting from a parallel parking state where other vehicles are parked in a front and a rear of the own vehicle in the vehicle start support device according to the first embodiment of the present invention.

FIG. 13A illustrates a state where the vehicle 5 parked in the left parallel parking is going to start by placing the shift position in the drive position.

At this time, it is determined that the vehicle 5 is the parallel parking by the foregoing parking style determination processing. Therefore, because the shift position is the drive position, it is recognized that the vehicle 5 is started in the advance state.

Then, referring to the result of the detection processing of the road-side portion H and recognizing that the road side is in the left side of the vehicle 5, it is determined that the vehicle 5 is parked in the left parallel parking, and the imaging range 28*a* of the right side camera 28 (not shown) is set to the monitoring area K. Because the imaging range 28*a* of the right side camera 28 (not shown) has an angle of view of about 180 degrees, the set monitoring area K securely covers a supposed advancing direction of the starting vehicle 5 and a right rear direction to which attention should be paid in starting. In addition, for example, it is possible to catch the moving vehicle 92 approaching the right rear of the vehicle 5 in the monitoring area K.

Note that, at this time, because the adjacent vehicle C exists in the rear of the vehicle 5, a dead area of the rear camera 26 (not shown) occurs. Accordingly, the rear of the vehicle 5 is not set to the monitoring area K.

Figure 13B:
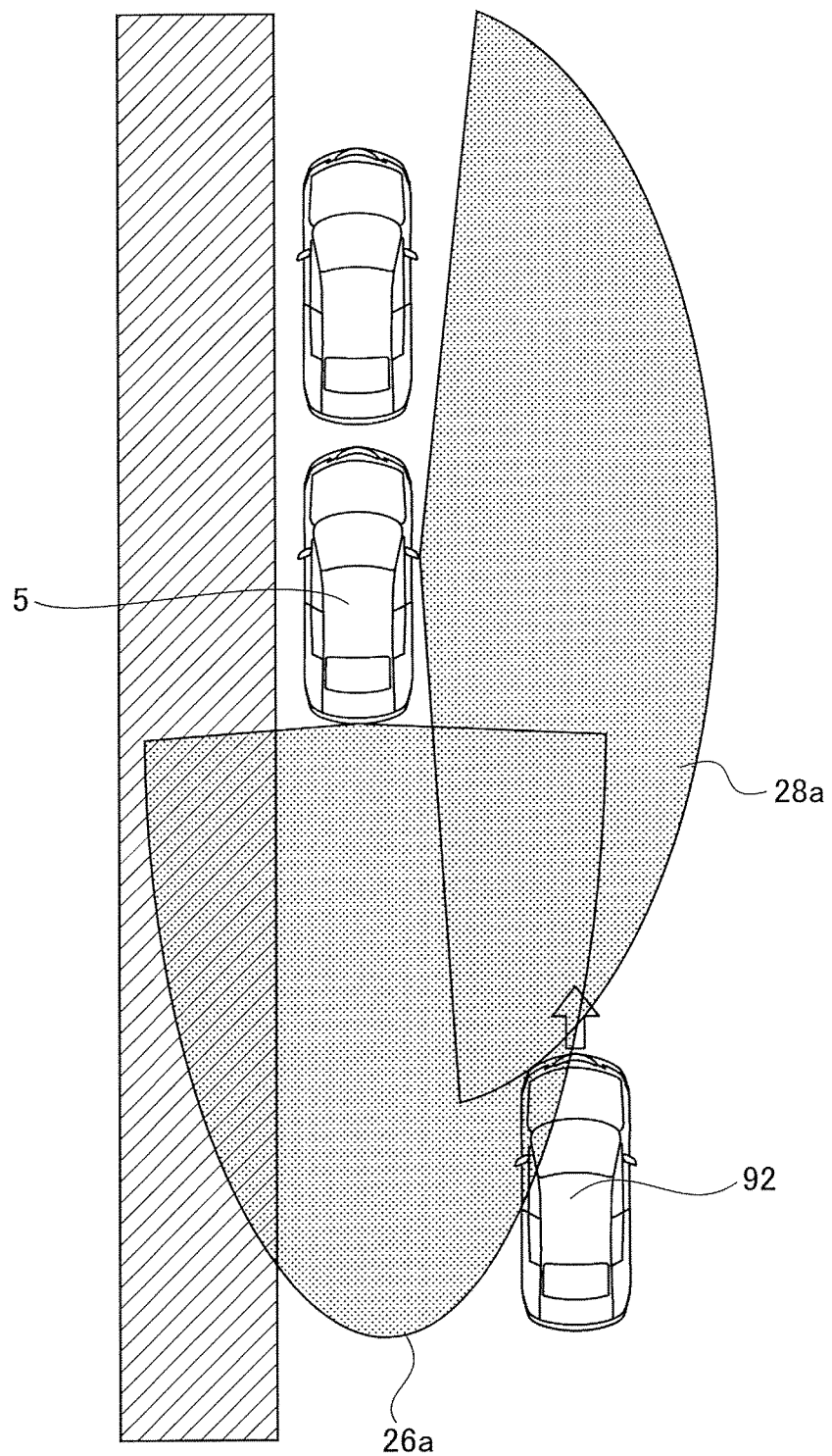
FIG. 13B is an explanatory view explaining a setting state of a monitoring area set in starting from the parallel parking state where the other vehicle is parked in only the front of the own vehicle in the vehicle start support device according to the first embodiment of the present invention.

Next, FIG. 13B illustrates a state where the vehicle 5 parked in the left parallel parking is going to start by placing the shift position in the drive position.

At this time, it is determined that the vehicle 5 executed the parallel parking by the foregoing parking style determination processing. Therefore, because the shift position is the drive position, it is recognized that the vehicle 5 is started in the advance state.

Then, referring to the result of the detection processing of the road-side portion H and recognizing that the road side is in the left side of the vehicle 5, it is determined that the vehicle 5 is parked in the left parallel parking, and the imaging range 28*a* of the right side camera 28 (not shown) is set to the monitoring area K.

In addition, by the foregoing vehicle surrounding state recognition processing, it is determined that the adjacent vehicle C does not exist in the rear of the vehicle 5. Therefore, the imaging range 26*a* of the rear camera 26 (not shown) is also set to the monitoring area K. In this way, the set monitoring area K further securely covers a supposed advancing direction of the starting vehicle 5 and a right rear direction to which attention should be paid in starting. In addition, for example, it is possible to catch the moving vehicle 92 approaching the right rear of the vehicle 5 in the monitoring area K.

<Description of Flow of Monitoring Area Setting Processing>

Figure 14A:
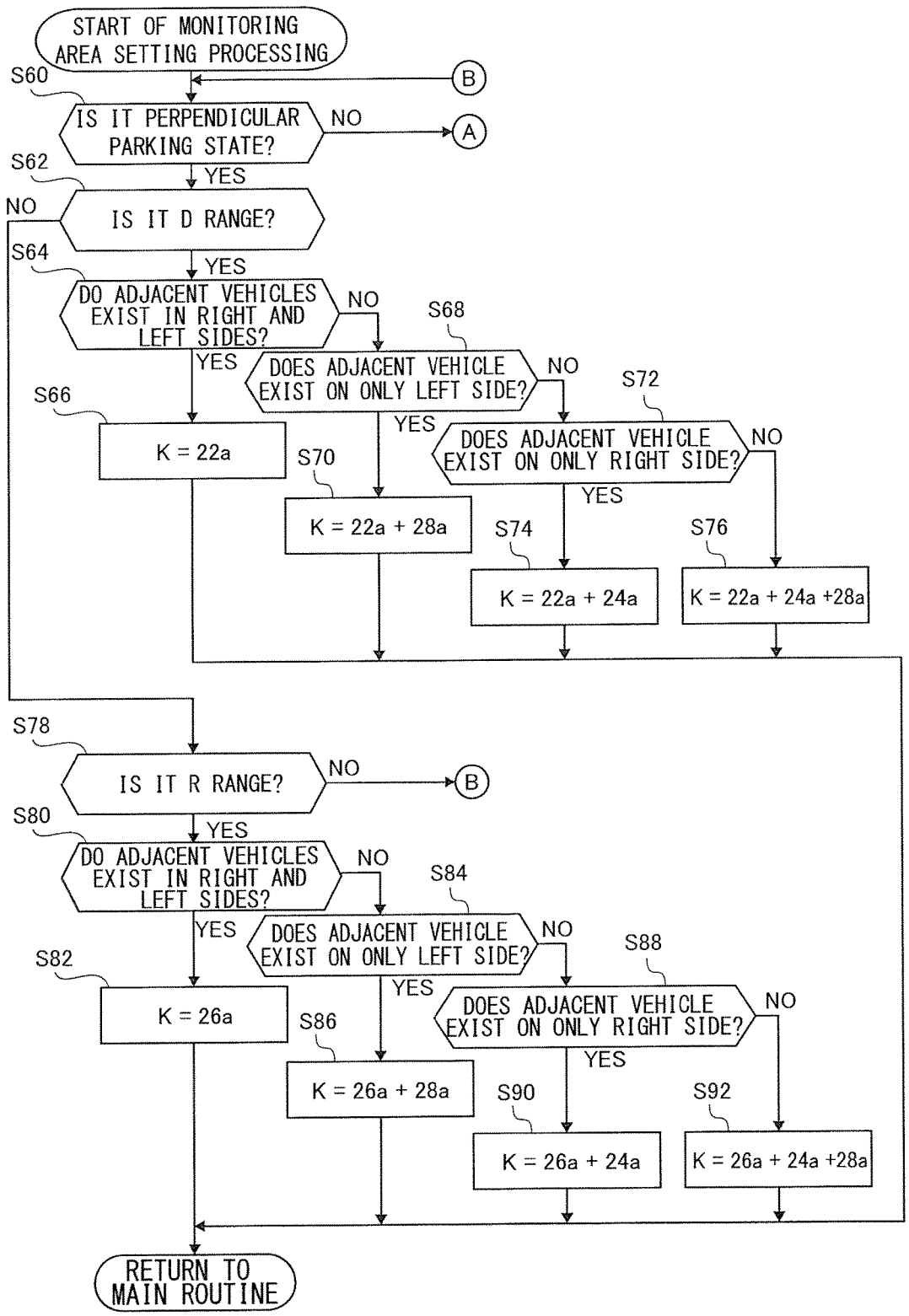
FIG. 14A is a first flow chart showing a flow of monitoring area setting processing.
Figure 14B:
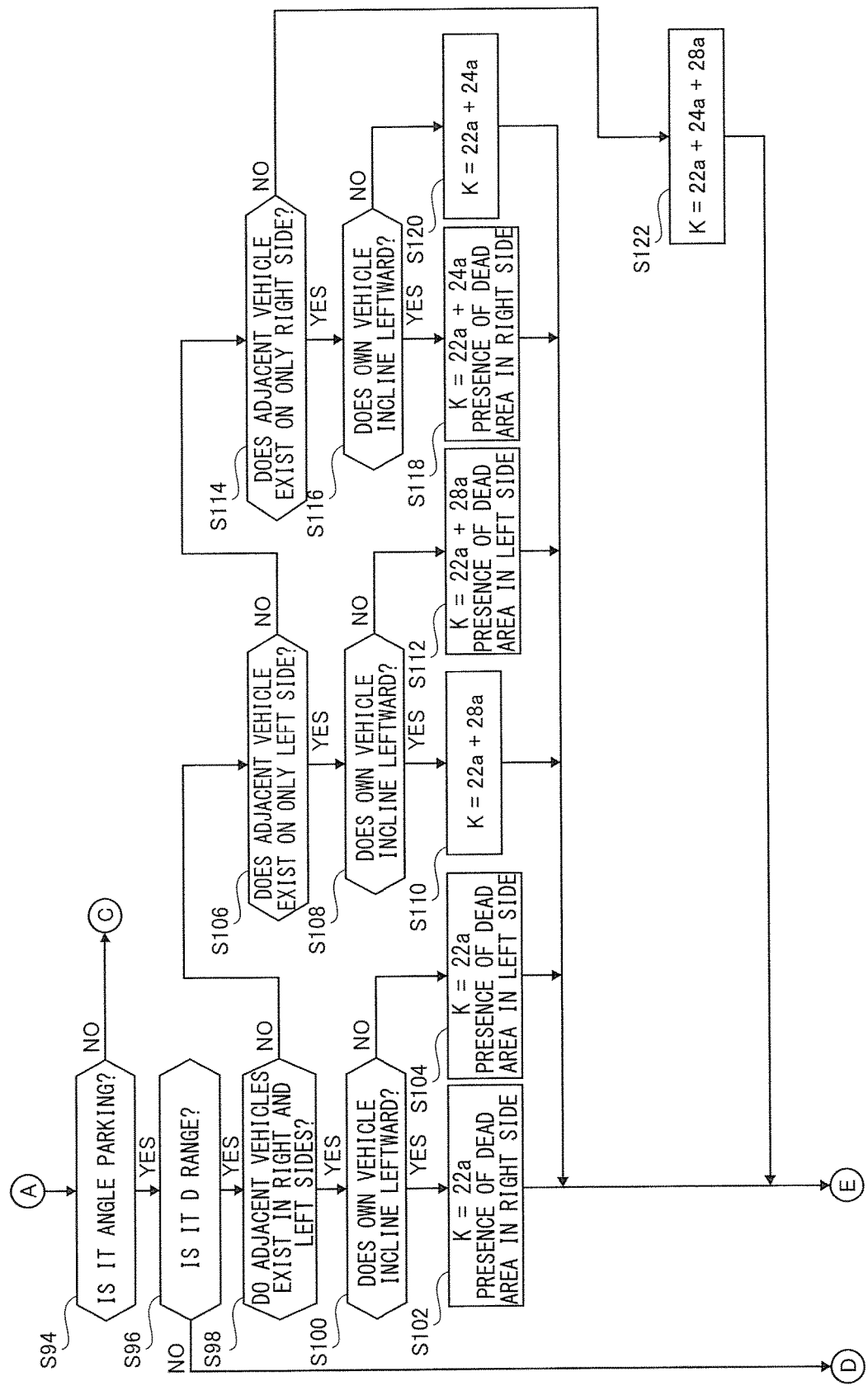
FIG. 14B is a second flow chart which follows the first flow chart and showing the flow of the monitoring area setting processing.
Figure 14C:
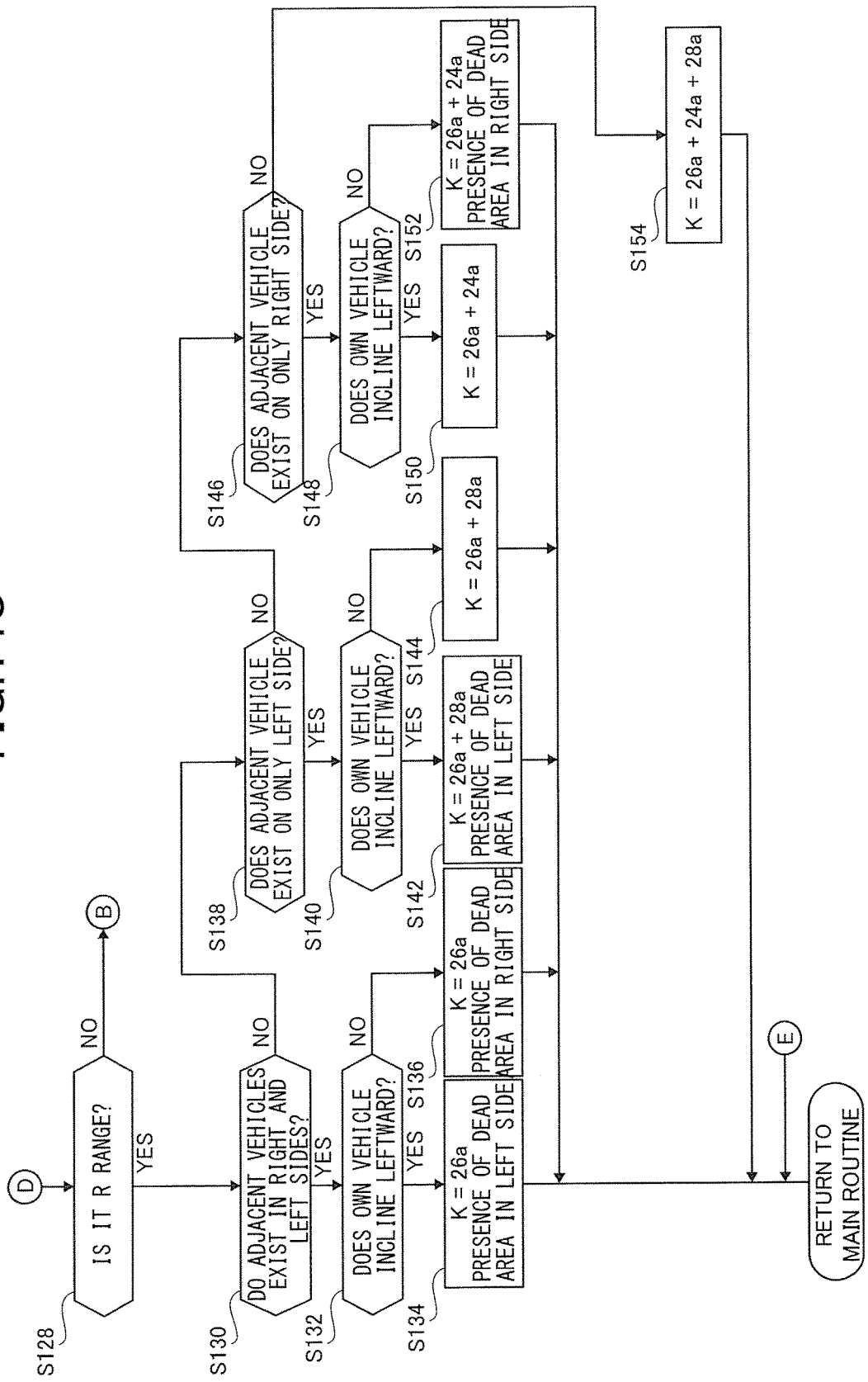
FIG. 14C is a third flow chart which follows the second flow chart and showing the flow of the monitoring area setting processing.

Next, a flow of monitoring area setting processing executed in the monitoring area setter 52 is described with reference to a flow chart shown in FIGS. 14A to 14C.

Note that, for ease of the following description, for example, setting the imaging range 22*a* of the front camera 22 in the monitoring area K is represented to be K=22a. In addition, setting both the imaging range 22*a* of the front camera 22 and the imaging range 24*a* of the left side camera 24 in the monitoring area K is represented to be K=22a+24a.

(Step S60)

Whether the vehicle 5 is the perpendicular parking state is determined. When the vehicle is the perpendicular parking state, the flow proceeds to step S62, when the vehicle is not the perpendicular parking state, the flow proceeds to step S94 (FIG. 14B.

(Step S62)

Whether the shift position of the vehicle 5 is the D range is determined. When it is the D range, the flow proceeds to step S64, and when it is not the D range, the flow proceeds to step S78.

(Step S64)

Whether the adjacent vehicles A exist in the right and left both sides of the vehicle 5 is determined. When the adjacent vehicles A exist in the right and left both sides of the vehicle 5, the flow proceeds to step S66, if not so, the flow proceeds to step S68.

(Step S66)

The monitoring area K is set to the imaging range 22*a* of the front camera 22. That is to say, the setting, K=22a is established. Therefore, the flow is returned to a main routine (FIG. 6).

(Step S68)

Whether the adjacent vehicle A exists in only the left side of the vehicle 5 is determined. When the adjacent vehicle A exists in only the left side of the vehicle 5, the flow proceeds to step S70, if not so, the flow proceeds to step S72.

(Step S70)

The monitoring area K is set to the imaging range 22*a* of the front camera 22 and the imaging range 28*a* of the right side camera 28. That is to say, the setting, K=22a+28a is established. Thereafter, the flow is returned to the main routine (FIG. 6).

(Step S72)

Whether the adjacent vehicle A exists in only the right side of the vehicle 5 is determined. When the adjacent vehicle A exists in only the right side of the vehicle 5, the flow proceeds to step S74, if not so, the flow proceeds to step S76.

(Step S74)

The monitoring area K is set to the imaging range 22*a* of the front camera 22 and the imaging range 24*a* of the left side camera 24. That is to say, the setting, K=22a+24a is established. Thereafter, the flow is returned to the main routine (FIG. 6).

(Step S76)

The monitoring area K is set to the imaging range 22*a* of the front camera 22, the imaging range 24*a* of the left side camera 24, and the imaging range 28*a* of the right side camera 28. That is to say, the setting, K=22a+24a+28a is established. Thereafter, the flow is returned to the main routine (FIG. 6).

(Step S78)

Whether the shift position of the vehicle 5 is the R range is determined. When the shift position of the vehicle 5 is the R range, the flow proceeds to step S80, and when it is other than the R range (P range or N range), the flow returns to step S60.

(Step S80)

Whether the adjacent vehicles A exist in the right and left both sides of the vehicle 5 is determined. When the adjacent vehicles A exist in the right and left both sides of the vehicle 5, the flow proceeds to step S82, in other occasions, the flow proceeds to step S84.

(Step S82)

The monitoring area K is set to the imaging range 26*a* of the rear camera 26. That is to say, the setting, K=26a is established. Therefore, the flow is returned to the main routine (FIG. 6).

(Step S84)

Whether the adjacent vehicle A exists in only the left side of the vehicle 5 is determined. When the adjacent vehicle A exists in only the left side of the vehicle 5, the flow proceeds to step S86, if not so, the flow proceeds to step S88.

(Step S86)

Figure 14D:
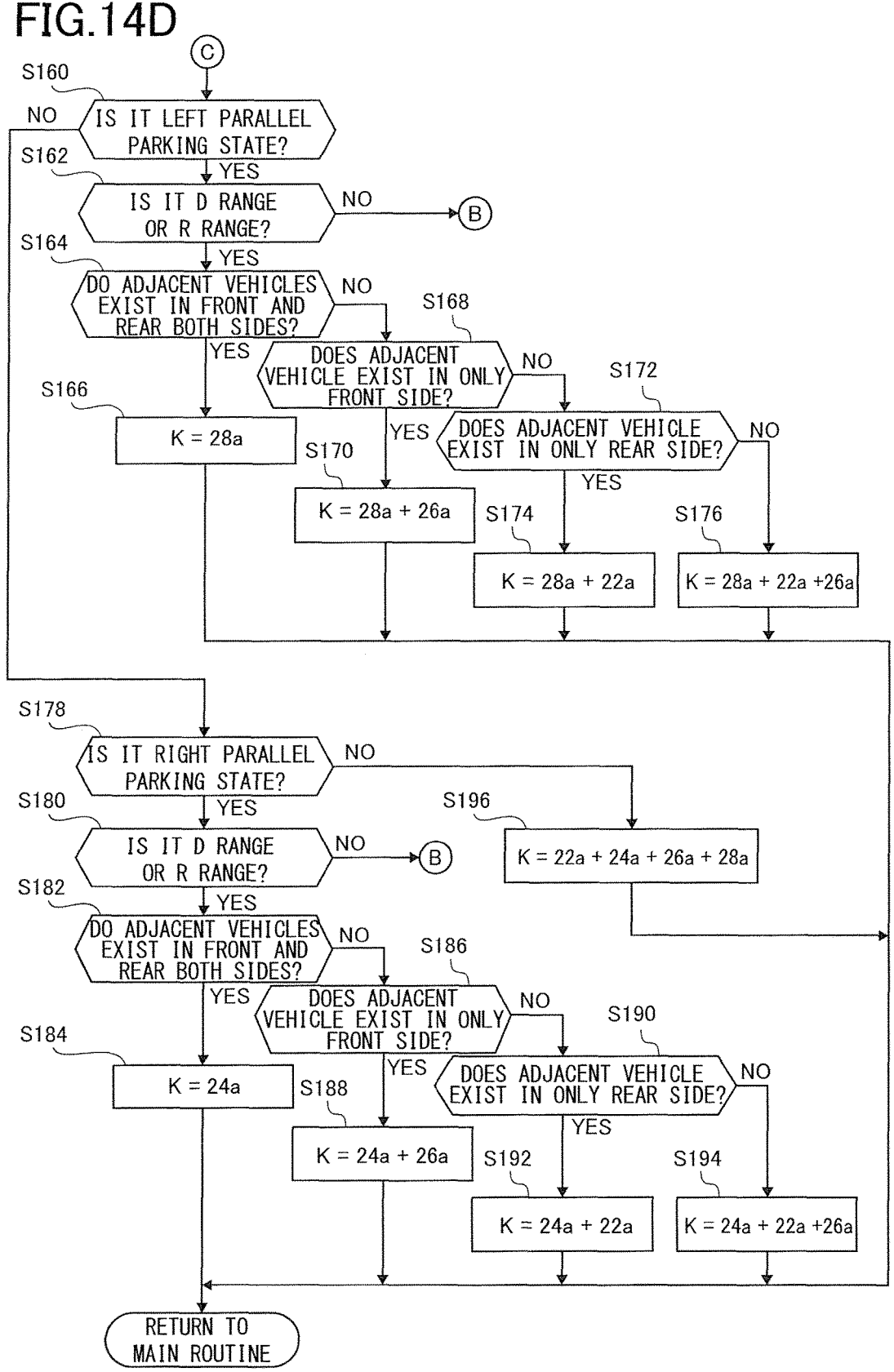
FIG. 14D is a fourth flow chart which follows the third flow chart and showing the flow of the monitoring area setting processing.

The monitoring area K is set to the imaging range 26*a* of the rear camera 261 and the imaging range 28*a* of the right side camera 28. That is to say, the setting, K=26a+28a is established. Thereafter, the flow is returned to the main routine (FIG. 6).
(Step S88)
Whether the adjacent vehicle A exists in only the right side of the vehicle 5 is determined. When the adjacent vehicle A exists in only the right side of the vehicle 5, the flow proceeds to step S90, if not so, the flow proceeds to step S92.
(Step S90)
The monitoring area K is set to the imaging range 26*a* of the rear camera 26 and the imaging range 24*a* of the left side camera 24. That is to say, the setting, K=26a+24a is established. Thereafter, the flow is returned to the main routine (FIG. 6).
(Step S92)
The monitoring area K is set to the imaging range 26*a* of the rear camera 26, the imaging range 24*a* of the left side camera 24, and the imaging range 28*a* of the right side camera 28. That is to say, the setting, K=26a+24a+28a is established. Thereafter, the flow is returned to the main routine (FIG. 6).
(Step S94)
Whether the vehicle 5 is the angle parking state is determined. When the vehicle 5 is the angle parking state, the flow proceeds to step S96, if not so, the flow proceeds to step S160 (FIG. 14D).
(Step S96)
Whether the shift position of the vehicle 5 is the D range is determined. When it is the D range, the flow proceeds to step S98, in the other occasions, the flow proceeds to step S128 (FIG. 14C).
(Step S98)
Whether the adjacent vehicles A exist in the right and left both sides of the vehicle 5 is determined. When the adjacent vehicles A exist in the right and left both sides of the vehicle 5, the flow proceeds to step S100, if not so, the flow proceeds to step S106.
(Step S100)
Whether the vehicle 5 is angularly parked to incline leftward is determined. When the vehicle 5 is angularly parked to incline leftward, the flow proceeds to step S102, if not so, the flow proceeds to step S104.
(Step S102)
The monitoring area K is set to the imaging range 22*a* of the front camera 22. That is to say, the setting, K=22a is established. In addition, it is determined that a dead area exists in the right side of the vehicle 5. Thereafter, the flow is returned to the main routine (FIG. 6).
(Step S104)
The monitoring area K is set to the imaging range 22*a* of the front camera 22. That is to say, the setting, K=22a is established. In addition, it is determined that a dead area exists in the left side of the vehicle 5. Thereafter, the flow is returned to the main routine (FIG. 6).
(Step S106) Whether the adjacent vehicle A exists in only the left side of the vehicle 5 is determined. When the adjacent vehicle A exists in only the left side of the vehicle 5, the flow proceeds to step S108, if not so, the flow proceeds to step S 114.
(Step S108)
Whether the vehicle 5 is parked in the angle parking to incline leftward is determined. When the vehicle 5 is parked in the angle parking to incline leftward, the flow proceeds to step S110, if not so, the flow proceeds to step S112.

(Step S110)
The monitoring area K is set to the imaging range 22*a* of the front camera 22 and the imaging range 28*a* of the right side camera 28. That is to say, the setting. K=22a+28a is established. Thereafter, the flow is returned to the main routine (FIG. 6).
(Step S112)
The monitoring area K is set to the imaging range 22*a* of the front camera 22 and the imaging range 28*a* of the right side camera 28. That is to say, the setting, K=22a+28a is established. In addition, it is determined that the dead area exists in the left side of the vehicle 5. Thereafter, the flow is returned to the main routine (FIG. 6).
(Step S114)
Whether the adjacent vehicle A exists in only the right side of the vehicle 5 is determined. When the adjacent vehicle A exists in only the right side of the vehicle 5, the flow proceeds to step S116, if not so, the flow proceeds to step S122.
(Step S116)
Whether the vehicle 5 is parked in the angle parking to incline leftward is determined. When the vehicle 5 is parked in the angle parking to incline leftward, the flow proceeds to step S118, if not so, the flow proceeds to step S120.
(Step S118)
The monitoring area K is set to the imaging range 22*a* of the front camera 22 and the imaging range 24*a* of the left side camera 24. That is to say, the setting, K=22a+24a is established. In addition, it is determined that the dead area exists in the right side of the vehicle 5. Thereafter, the flow is returned to the main routine (FIG. 6).
(Step S120)
The monitoring area K is set to the imaging range 22*a* of the front camera 22 and the imaging range 24*a* of the left side camera 24. That is to say, the setting, K=22a+24a is established. Thereafter, the flow is returned to the main routine (FIG. 6).
(Step S122)
The monitoring area K is set to the imaging range 22*a* of the front camera 22, the imaging range 24*a* of the left side camera 24, and the imaging range 28*a* of the right side camera 28. That is to say, the setting, K=22a+24a+28a is established. Thereafter, the flow is returned to the main routine (FIG. 6).
(Step S128)
Whether the shift position of the vehicle 5 is the R range is determined. When it is the R range, the flow proceeds to step S130, it is the other than the R range (P range or N range), the flow returns to step S60 (FIG. 14A).
(Step S130)
Whether the adjacent vehicles A exist in the right and left both sides of the vehicle 5 is determined. When the adjacent vehicles A exist in the right and left both sides of the vehicle 5, the flow proceeds to step S132, if not so, the flow proceeds to step S138.
(Step S132)
Whether the vehicle 5 is parked in the angle parking to incline leftward is determined. When the vehicle 5 is parked in the angle parking to incline leftward, the flow proceeds to step S134, if not so, the flow proceeds to step S136.
(Step S134)
The monitoring area K is set to the imaging range 26*a* of the rear camera 26. That is to say, the setting, K=26a is established. In addition, it is determined that the dead area exists in the left side of the vehicle 5. Thereafter, the flow is returned to the main routine (FIG. 6).

(Step S136)

The monitoring area K is set to the imaging range 26a of the rear camera 26. That is to say, the setting, K=26a is established. In addition, it is determined that the dead area exists in the right side of the vehicle 5. Thereafter, the flow is returned to the main routine (FIG. 6).

(Step S138)

Whether the adjacent vehicle A exists in only the left side of the vehicle 5 is determined. When the adjacent vehicle A exists in only the left side of the vehicle 5, the flow proceeds to step S140, if not so, the flow proceeds to step S146.

(Step S140)

Whether the vehicle 5 is parked in the angle parking to incline leftward is determined. When the vehicle 5 is parked in the angle parking to incline leftward, the flow proceeds to step S142, if not so, the flow proceeds to step S144.

(Step S142)

The monitoring area K is set to the imaging range 26a of the rear camera 26 and the imaging range 28a of the right side camera 28. That is to say, the setting, K=26a+28a is established. In addition, it is determined that the dead area exists in the left side of the vehicle 5. Thereafter, the flow is returned to the main routine (FIG. 6).

(Step S144)

The monitoring area K is set to the imaging range 26a of the rear camera 26 and the imaging range 28a of the right side camera 28. That is to say, the setting, K=26a+28a is established. Thereafter, the flow is returned to the main routine (FIG. 6).

(Step S146)

Whether the adjacent vehicle A exists in only the right side of the vehicle 5 is determined. When the adjacent vehicle A exists in only the right side of the vehicle 5, the flow proceeds to step S148, if not so, the flow proceeds to step S154.

(Step S148)

Whether the vehicle 5 is parked in the angle parking to incline leftward is determined. When the vehicle 5 is parked in the angle parking to incline leftward, the flow proceeds to step S150, if not so, the flow proceeds to step S152.

(Step S150)

The monitoring area K is set to the imaging range 26a of the rear camera 26 and the imaging range 24a of the left side camera 24. That is to say, the setting, K=26a+24a is established. Thereafter, the flow is returned to the main routine (FIG. 6).

(Step S152)

The monitoring area K is set to the imaging range 26a of the rear camera 26 and the imaging range 24a of the left side camera 24. That is to say, the setting, K=26a+24a is established. In addition, it is determined that the dead area exists in the right side of the vehicle 5. Thereafter, the flow is returned to the main routine (FIG. 6).

(Step S154)

The monitoring area K is set to the imaging range 26a of the rear camera 26, the imaging range 24a of the left side camera 24, and the imaging range 28a of the right side camera 28. That is to say, the setting, K=26a+24a+28a is established. Thereafter, the flow is returned to the main routine (FIG. 6).

(Step S160)

Whether the vehicle 5 is the left parallel parking state is determined. When the vehicle 5 is the left parallel parking state, the flow proceeds to step S162, if not so, the flow proceeds to step S178.

(Step S162)

Whether the shift position of the vehicle 5 is the D range or the R range is determined. When the shift position of the vehicle 5 is the D range or the R range, the flow proceeds to step S164, if not so, the flow returns to step S60 (FIG. 14A).

(Step S164)

Whether the adjacent vehicles C exist in the front and rear both sides of the vehicle 5 is determined. When the adjacent vehicles C exist in the front and rear both sides of the vehicle 5, the flow proceeds to step S166, if not so, the flow proceeds to step S168.

(Step S166)

The monitoring area K is set to the imaging range 28a of the right side camera 28. That is to say, the setting, K=28a is established. Thereafter, the flow is returned to the main routine (FIG. 6).

(Step S168)

Whether the adjacent vehicle C exists in only the front side of the vehicle 5 is determined. When the adjacent vehicle C exists in only the front side of the vehicle 5, the flow proceeds to step S170, if not so, the flow proceeds to step S172.

(Step S170)

The monitoring area K is set to the imaging range 28a of the right side camera 28 and the imaging range 26a of the rear camera 26. That is to say, the setting, K=28a+26a is established. Thereafter, the flow is returned to the main routine (FIG. 6).

(Step S172)

Whether the adjacent vehicle C exists in only the rear side of the vehicle 5 is determined. When the adjacent vehicle C exists in only the rear side of the vehicle 5, the flow proceeds to step S174, if not so, the flow proceeds to step S176.

(Step S174)

The monitoring area K is set to the imaging range 28a of the right side camera 28 and the imaging range 22a of the front camera 22. That is to say, the setting, K=28a+22a is established. Thereafter, the flow is returned to the main routine (FIG. 6).

(Step S176)

The monitoring area K is set to the imaging range 28a of the right side camera 28, the imaging range 22a of the front camera 22, and the imaging range 26a of the rear camera 26. That is to say, the setting, K=28a+22a+26a is established. Thereafter, the flow is returned to the main routine (FIG. 6).

(Step S178)

Whether the vehicle 5 is the right parallel parking state is determined. When the vehicle 5 is the right parallel parking state, the flow proceeds to step S180, if not so, the flow proceeds to step S196.

(Step S180)

Whether the shift position of the vehicle 5 is the D range or the R range is determined. When the shift position of the vehicle 5 is the D range or the R range, the flow proceeds to step S182, if not so, the flow returns to step S60 (FIG. 14A).

(Step S182)

Whether the adjacent vehicles C exist in the front and rear both sides of the vehicle 5 is determined. When the adjacent vehicles C exist in the front and rear both sides of the vehicle 5, the flow proceeds to step S184, if not so, the flow proceeds to step S186.

(Step S184)

The monitoring area K is set to the imaging range 24a of the left side camera 24. That is to say, the setting, K 24a is established. Thereafter, the flow is returned to the main routine (FIG. 6).

(Step S186)

Whether the adjacent vehicle C exists in only the front side of the vehicle 5 is determined. When the adjacent vehicle C exists in only the front side of the vehicle 5, the flow proceeds to step S188, if not so, the flow proceeds to step S190.

(Step S188)

The monitoring area K is set to the imaging range 24*a* of the left side camera 24 and the imaging range 26*a* of the rear camera 26. That is to say, the setting, K=24a+26a is established. Thereafter, the flow is returned to the main routine (FIG. 6).

(Step S190)

Whether the adjacent vehicle C exists in only the rear side of the vehicle 5 is determined. When the adjacent vehicle C exists in only the rear side of the vehicle 5, the flow proceeds to step S192, if not so, the flow proceeds to step S194.

(Step S192)

The monitoring area K is set to the imaging range 24*a* of the left side camera 24 and the imaging range 22*a* of the front camera 22. That is to say, the setting, K=24a+22a is established. Thereafter, the flow is returned to the main routine (FIG. 6).

(Step S194)

The monitoring area K is set to the imaging range 24*a* of the left side camera 24, the imaging range 22*a* of the front camera 22, and the imaging range 26*a* of the rear camera 26. That is to say, the setting, K=24a+22a+26a is established. Thereafter, the flow is returned to the main routine (FIG. 6).

(Step S196)

The monitoring area K is set to the imaging range 22*a* of the front camera 22, the imaging range 24*a* of the left side camera 24, the imaging range 26*a* of the rear camera 26 and the imaging range 28*a* of the right side camera 28. That is to say, the setting, K=22a+24a+26a+28a is established. In this case, because it is determined to apply to neither of the parking styles, the entire surroundings of the vehicle 5 are set to the monitoring area. Thereafter, the flow is returned to the main routine (FIG. 6).

<Description of Vehicle Surrounding State Provision Processing>

The vehicle surrounding state provider 54 provides a driver of the vehicle 5 with a surrounding state of the vehicle 5 observed within the monitoring area K set to the monitoring area setter 52.

Concretely, the monitor 85 displays an image(s) of the monitoring area K set to the monitoring area setter 52 and imaged by the imagers 20. At this time, a coordinate transformation and an image synthesis are applied to the image displayed on the monitor 85 in accordance with the number of images as imaged. Then, the image formed in this way is displayed on the monitor 85 together information showing in what direction the image imaged.

Furthermore, moving object detection processing that detects a moving object within the set monitoring area K is executed in the moving object detector 55. Concretely, the moving object is detected based on a difference between frames of images imaged in time series, or variation of distance data measured by the ranging sensor 30 in the set monitoring area K. The detected moving is superimposed on the imaged image of the monitoring area K and displayed on the monitor 85.

When the dead area exists in the monitoring area K, attention to a driver is paid by superimposing the monitoring area K on the imaged image and displaying an icon showing that a dead area necessary to give attention attraction to the driver exists.

Next, concrete examples of providing the surrounding state are described with reference to FIGS. 16 to 18.

Figure 16:
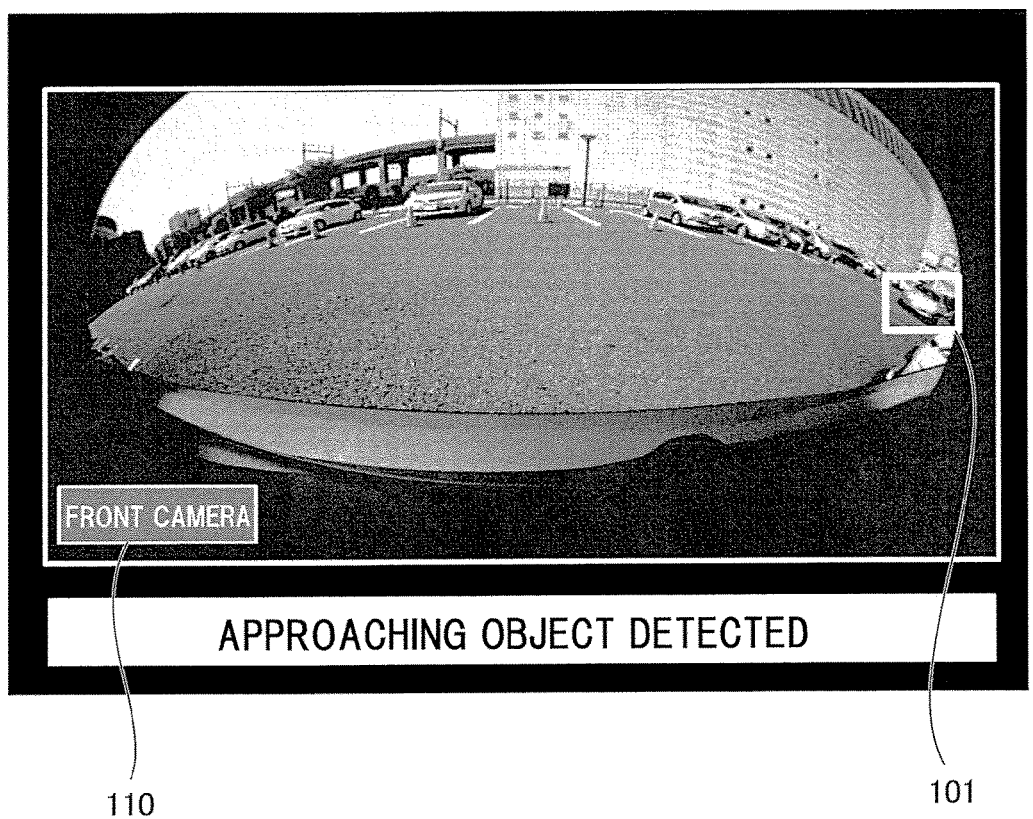
FIG. 16 is a view showing an example of information in which a vehicle surrounding state provider outputs to a monitor of the vehicle, when the vehicle is a state of FIG. 11.

FIG. 16 illustrates an example of an image displayed on the monitor 85 when the vehicle 5 parked in the perpendicular parking starts in the advance state (see FIG. 11A).

At this time, the image imaged by the front camera 22 is displayed on the monitor 85 together with a camera icon 110 showing the monitoring area K. In addition, when the moving object is detected in the monitoring area K, a moving object icon 101 showing that the moving vehicle 92 (see FIG. 11A) is approaching is superimposed on the image and displayed.

Moreover, attention attraction information showing that the moving object is detected is displayed at a lower portion of the image. The attention attraction information may be output from the speaker 90 as sound information in addition to the display.

Figure 17:
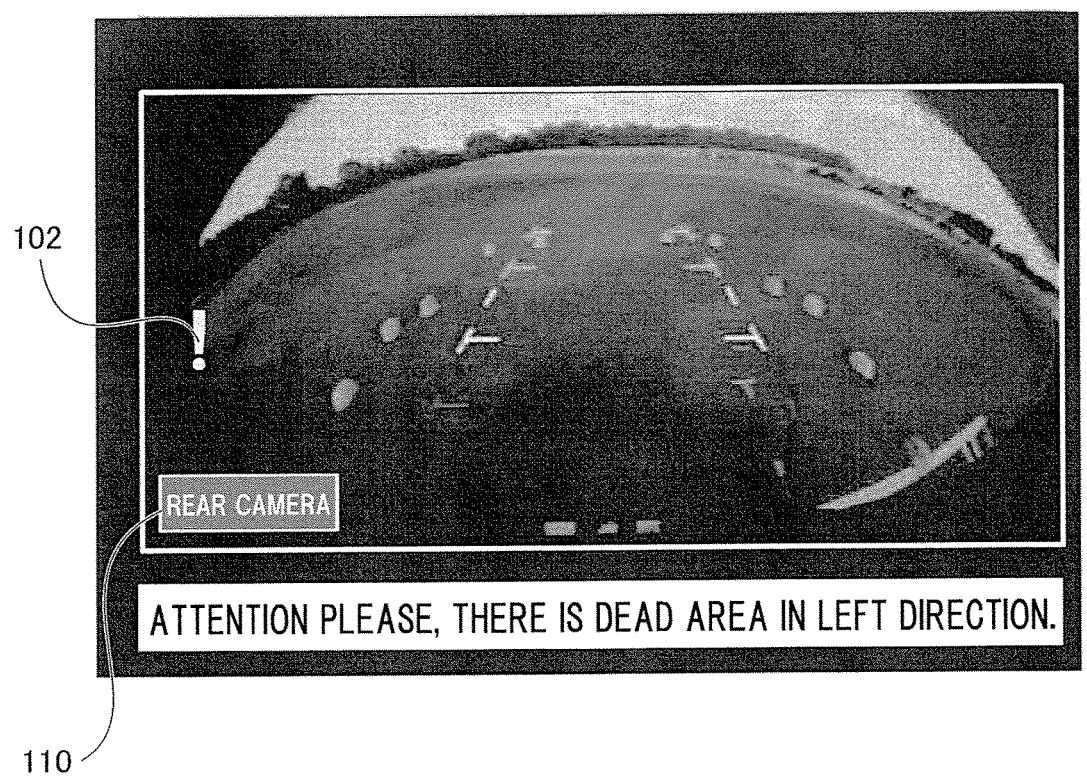
FIG. 17 is a view showing an example of information in which a vehicle surrounding state provider outputs to a monitor of the vehicle, when the vehicle is a state of FIG. 12.

FIG. 17 illustrates an example of an image displayed on the monitor 85 when the vehicle 5 parked in the angle parking to incline leftward starts in the retreat state (see FIG. 12B).

At this time, the image imaged by the rear camera 26 is displayed on the monitor 85 together with the camera icon 110 showing the monitoring area K. In addition, the monitor 85 displays that the dead area 100 (see FIG. 12B) exists in the left side of the vehicle 5 by superimposing an attention attraction icon 102 on the dead area at a position on the image, showing a direction where the dead area 100 exists.

Moreover, attention attraction information showing that the dead area exists is detected is displayed at a lower portion of the image. The attention attraction information may be output from the speaker 90 as sound information in addition to the display.

Figure 18:
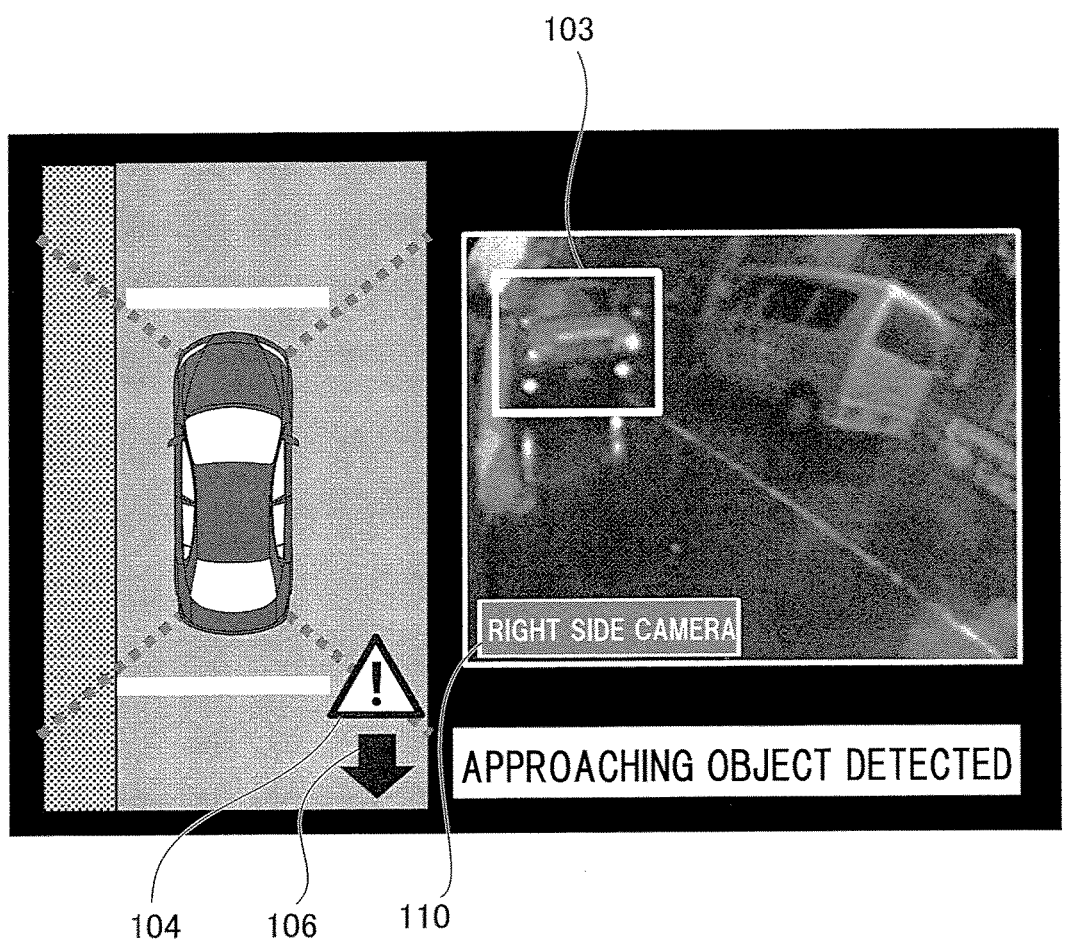
FIG. 18 is a view showing an example of information in which a vehicle surrounding state provider outputs to a monitor of the vehicle, when the vehicle is a state of FIG. 13A.

FIG. 18 illustrates an example of an image displayed on the monitor 85 when the vehicle 5 parked in the left parallel parking starts in the advance state (see FIG. 13A).

At this time, a right rear area of the vehicle 5 necessary to pay attention in starting is taken out from the image imaged by the right side camera 28, transformed to be capable of simulating a picture projected on a right side door mirror of the vehicle 5, and displayed on an area of a right half of the monitor 85 together with the camera icon 110 showing the monitoring area K. Note that the transformation of the image is executed by taking out the right rear area of the vehicle 5 from the image imaged by the right side camera 28 and applying a well-known mirror image transformation or affine transformation to the taken out image.

In addition, when the moving object is detected in the monitoring area K, a moving object icon 103 showing that the moving vehicle 92 (see FIG. 13A) is approaching is superimposed on the image and displayed.

Here, a CG (Computer Graphic) image overlooked the vehicle 5 from just above may be displayed on an area of left half of the monitor 85. A warning icon 104 showing that the moving object is approaching and an attention direction indicating icon 106 indicating the right rear area of the vehicle 5 necessary to pay attention are superimposed to clearly display a direction where attention must be paid.

Here, an image overlooked the vehicle may be displayed on the area of left half of the monitor 85 by converting a viewpoint of the actually imaged image which is not the CG image shown in FIG. 18 to synthesize the image.

<Description of Flow of Vehicle Surrounding State Provision Processing>

Figure 15:
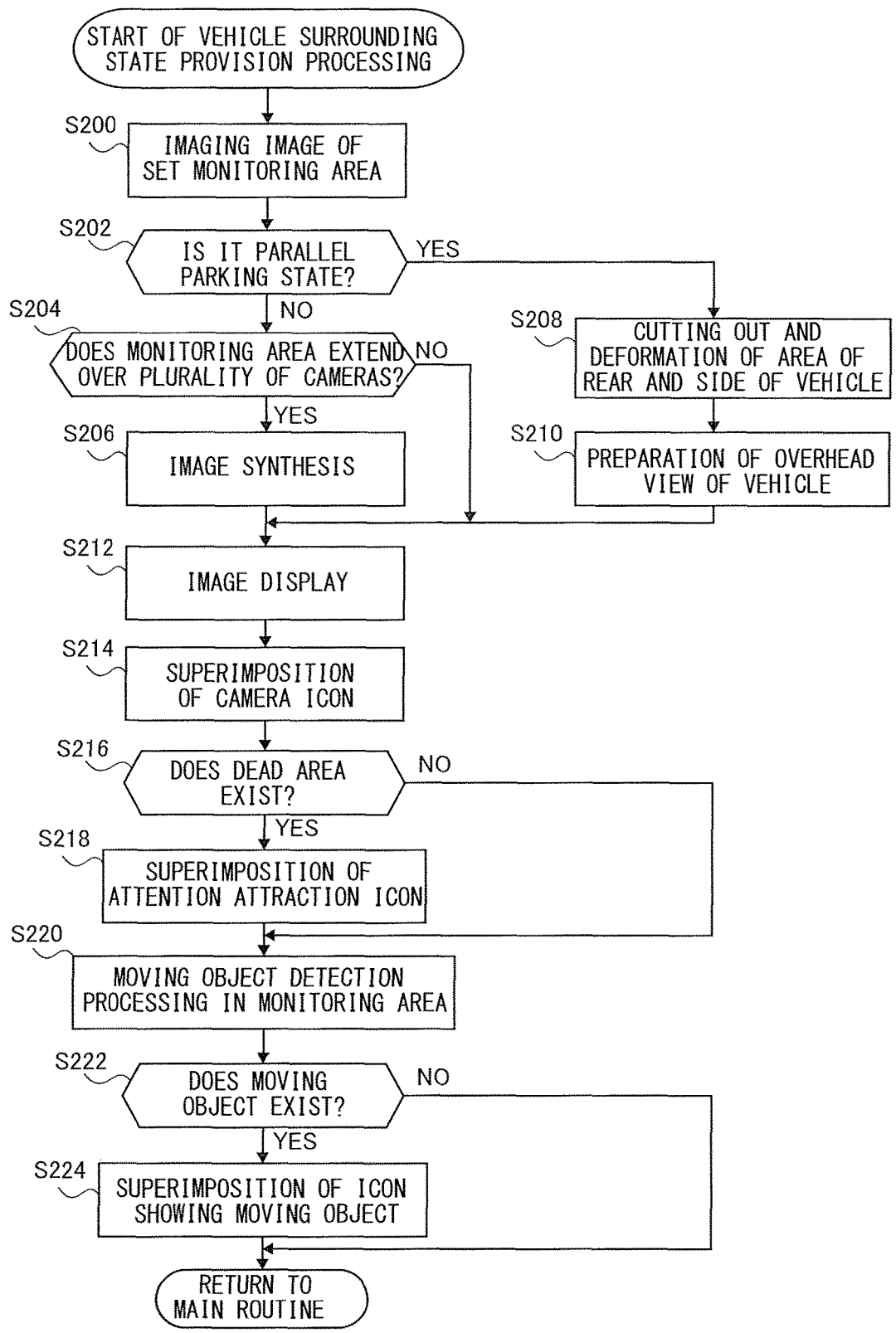
FIG. 15 is a flow chart showing a flow of vehicle surrounding state provision processing.

Next, a flow of vehicle surrounding state provision processing executed in the vehicle surrounding state provider 54 is described with reference to a flow chart shown in FIG. 15.

(Step S200)

Surrounding images of the vehicle 5 are imaged in the imagers 20 corresponding to the monitoring area K set by the monitoring area setting processing (Step S202)

Whether the vehicle 5 is the parallel parking state is determined. When the vehicle 5 is the parallel parking state, the flow proceeds to step S208, if not so, the flow proceeds to step S204.

(Step S204)

Whether the set monitoring area K is an area extending over a plurality of cameras is determined. When the set monitoring area K extends over the plurality of cameras, the flow proceeds to step S206, if not so, the flow proceeds to step S212.

(Step S206)

A plurality of images that image the monitoring area K is synthesized in a single image. Concretely, the plurality of images are synthesized in the single image by executing processing of synthesizing an overlooking image looked down at the vehicle from just above to convert a viewpoint of each image, or processing of synthesizing a panorama image by connecting each image.

(Step S208)

A rear side area of the roadway side, where attention is required to start the vehicle is taken out from the imaged image and processed to deform.

(Step S210)

The image overlooked the vehicle 5 from just above is prepared by use of the CG or the actually imaged picture.

(Step S212)

Of the imaged image (step S200), the synthesized image (step S206), the taken out and deformed image (step S208), and the prepared overlooking image (step S200), a corresponding image is displayed on the monitor 85.

(Step S214)

The camera icon 110 showing the monitoring area K is superimposed on the image displayed on the monitor 85.

(Step S216)

Whether the dead area exists in the set monitoring area K is determined. When the dead area exists in the set monitoring area K, the flow proceeds to step S218, if not so, the flow proceeds to step S220.

(Step S218)

The attention attraction icon 102 showing that the dead area exists is superimposed on the image displayed on the monitor 85.

(Step S220)

The detection of the moving object is executed in the set monitoring area K. Concretely, the moving object is detected based on a difference between frames of images imaged in time series, or variation of distance data measured by the ranging sensor 30.

(Step S222)

Whether the moving object is detected is determined. When the moving object is detected, the flow proceeds to step S224, if not so, the flow returns to the main routine.

(Step S224)

The moving object icons 101 and 103 are superimposed on the image displayed on the monitor 85 and the flow returns to the main routine (FIG. 6).

<Description of End Determination Processing of Surrounding State Provision>

Thereafter, in step S20 of the main routine (FIG. 6), whether the information provision is completed is determined. When it is determined that the information provision is completed, information provision end determination processing that ends the information provision is executed.

Concretely, a behavior of the vehicle 5 is detected by use of outputs from various sensors 70 provided on the vehicle 5. Then, when it is detected that the vehicle is out of the parking frame D1, the information provision from the vehicle surrounding state provider 54 is completed.

In the first embodiment, because the determination of the parking style is executed, information provision determination processing can be efficiently executed by use of the determination result.

For example, in the case where the vehicle 5 is the perpendicular parking state, it is determined that the vehicle 5 is out of the parking frame D1 and the information provision from the vehicle surrounding state provider 54 is completed, when detecting that the vehicle moves a predetermined distance or more and a direction of the vehicle changes a predetermined angle or more, by detecting a velocity and a steering angle of the vehicle after the vehicle 5 starts.

At this time, the vehicle velocity can be acquired from an output of a speed sensor. The steering angle can be acquired from an output of a steering sensor. A traveling distance can be calculated by integrating a velocity of the vehicle.

In the case where the vehicle 5 is the angle parking state, it is determined that the vehicle 5 is out of the parking frame D1 and the information provision from the vehicle surrounding state provider 54 is completed, when detecting that the vehicle moves a predetermined distance or more and a direction of the vehicle changes a predetermined angle or more, by detecting a velocity, a steering angle, and a traveling distance of the vehicle after the vehicle 5 starts. Here, a determination parameter used at this time is the same as that of the foregoing perpendicular parking state, but a threshold value for the determination is suitably changed, compared with the case of the perpendicular parking.

In the first embodiment, because it is possible to determine the parking style in which the vehicle has been executed, the threshold value of the determination parameter capable of securely recognizing that the vehicle is out of the parking frame D1 can be suitably set in accordance with the parking style.

Furthermore, when the vehicle 5 is the parallel parking state, by detecting a velocity and a state of a winker switch of the vehicle after the vehicle 5 starts, it is determined that the vehicle 5 is out of the parking frame D1 and the information provision from the vehicle surrounding state provider 54 is completed, when detecting that the velocity of the vehicle exceeds a predetermined value or a winker is turned off. Here, it is possible to determine the turning off of the winker by detecting that the output of the winker switch changes from an ON state to an OFF state.

Note that, in a case where the vehicle 5 has a lane recognition function that detects a position of the roadside when the vehicle 5 is running, the lane recognition function is operated when the vehicle 5 starts. When the vehicle runs, if the lane is recognized, it is determined that the vehicle is out of the parking frame D1, the information provision from the vehicle surrounding state provider may be competed.

Second Embodiment

Next, a second embodiment according to the present invention is described. A vehicle start support device 15 according to the second embodiment is configured to further securely execute the parking style determination processing by adding a function to determine a parking style before the vehicle 5 parks to the configuration of the vehicle start support device 10 described in the first embodiment.

In particular, the vehicle start support device 15 is applied to a vehicle having a parking support function or an automatic parking function that reduces a load of a driver by executing a search of a parking space or assist of a parking operation when the vehicle 5 parks. [Description of Configuration of Vehicle Start Support Device 15]

A configuration of the second embodiment is described with reference to FIG. 19. The vehicle start support device 15 in the second embodiment is installed on the vehicle 5 and includes an electronic controller 41 instead of the electronic controller 40 (FIG. 1) described in the first embodiment.

The electronic controller 41 includes a parking style determiner 51 instead of the parking style determiner 50 (FIG. 1) provided in the electronic controller 40 (FIG. 1). The electronic controller further includes a determination initiation indicator before parking 47. Other components are the same as that of the electronic controller 40.

The parking style determiner 51 further includes a determiner before parking 51a (secondary parking style determiner) that determines a parking style before the vehicle 5 initiates a parking operation and a determiner before starting 51b (parking style determiner) that determines a parking style executed in parking at a position where the vehicle 5 is parking.

That is to say, the determiner before starting 51b has the same function as the parking style determiner 50 in the first embodiment.

The determination initiation indicator before parking 47 indicates the initiation of the parking style determination processing. [Description of Operation of Vehicle Start Support Device 15]

When the vehicle 5 approaches a place to be parked, a driver operates the determination initiation indicator before parking 47 and actuates the parking style determination processing. The operation of the determination initiation indicator before parking 47 also serves operational initiation of the parking support function of the vehicle 5.

When the determination start indicator before parking 47 is operated, the parking style determination processing is initiated in the determiner before parking 51a.

At this time, the images imaged by the imagers 20 and the distance data of the surroundings of the vehicle 5, measured by the ranging sensor 30 are acquired and sent to the determiner before parking 51a.

The determiner before parking 51a executes a search of a space capable of parking the vehicle 5 on a circumference of the vehicle 5 based on the distance data.

Concretely, while running the vehicle 5, the parking frame lines constituting the parking frame from the images imaged by the imagers 20 are detected, and presence and absence of the obstacle is detected from the distance data measured by the ranging sensor 30. Thereby, it is possible to prepare a parking space map of the surroundings of the vehicle 5.

The determiner before parking 51a selects the space capable of parking from the parking space map prepared in this way, and provides a driver of the vehicle with information by the monitor 85 in the vehicle. At this time, a position and arrangement of the parking frame in the space capable of parking as detected are known. Therefore, the parking style necessary to park in the parking frame is necessarily decided.

The driver of the vehicle 5 receiving the information indicates a position wanting to park.

When receiving the indication of the parking position, the determiner before parking 51a determines the parking style and stores it in the determiner before parking 51a.

Thereafter, parking operation support such as the indication of the necessary parking operation, the notice of obstacle information, or the like is given to the driver of the vehicle 5 by use of the parking support function of the vehicle 5.

Even if the parking operation is completed and an engine of the vehicle 5 is cut, the information representing the parking style stored in the determiner before parking 51a is maintained.

When the engine of the vehicle 5 is started again, the vehicle style confirmation processing is actuated in the determiner before starting 51b, and whether the vehicle 5 takes the parking style actually determined in the determiner before parking 51a is confirmed.

The processing executed here is substantially the same as the parking style determination processing described in the first embodiment. However, in the second embodiment, before executing the parking, the parking style is determined. Therefore, it is a main object that whether the parking is executed by the actual parking style is confirmed. Accordingly, for example, because only the state of the parking frame lines of the surroundings of the vehicle 5 may be confirmed, the recognition of the adjacent vehicles or the obstacles is not necessary. As a result, the processing in the parking style determination processing (FIG. 9) described in the first embodiment is simple.

Thereafter, although the monitoring area setting processing, the vehicle surrounding state provision processing, the information provision end determination processing are sequentially executed, the content of these processing is as described in the first embodiment.

As described above, in the vehicle start support device 10 according to the first embodiment, when the start operation detector 48 detects that there is a possibility that the parking vehicle 5 starts, the vehicle surrounding state recognizer 46 recognizes the parking frame lines E, the adjacent vehicles A, C, the obstacle G other than the vehicle, and the road-side portion H which are the states of the surroundings of the vehicle 5, based on the images imaged by the imagers 20 (the plurality of cameras, the front camera 22, the left side camera 24, the rear camera 26, and the right side camera 28). The parking style determiner 50 determines the parking style executed when the vehicle 5 parks at a present parking position, based on the recognition result of the vehicle surrounding state recognizer 46. The monitoring area setter 52 sets the monitoring area K where the driver requires to pay attention when starting the vehicle 5 based on the determination result of the parking style determiner 50 and the recognition result of the vehicle surrounding state recognizer 46. Next, the moving object detector 55 detects the moving object approaching the vehicle 5 in the monitoring area K set in the monitoring area setter 52, and the vehicle surrounding state provider 54 provides the driver with the information provision with respect to the set monitoring area K. The information provision end determiner 56 can execute the attention attraction of accurate start operation to the driver in accordance with the parking style to end the information provision from the vehicle surrounding state provider 54 when it is determined that the start operation is completed based on the behavior of the vehicle 5, and further automatically can end the information provision when the start operation is completed. As a result, because unnecessary attention attraction is not provided, the driver can securely and smoothly start the vehicle 5 without confusing the driver by the unnecessary information provision. The driver can receive accurate information provision to support the start of the vehicle without requiring any special operation in starting the vehicle 5. In addition, because the detection of the moving object may execute only in the set monitoring area K, it is possible to efficiently execute the detection processing of the moving object.

Moreover, in the vehicle start support device 10 according to the first embodiment, the vehicle surrounding state recognizer 46 recognizes the position of the parking frame lines E constituting the parking frame D1 in which the vehicle 5 parks, the position of the parking frames D2 adjacent to the vehicle 5, the position of the adjacent vehicles A adjacent to the right and the left of the vehicle 5, the presence and the absence of the adjacent vehicles C which are stopping and adjacent to the vehicle 5 at the front and the rear thereof, the presence and the absence of obstacles other than vehicles existing in the right and the left of the vehicle 5, and the position of the roadside portion H existing on the surroundings of the vehicle 5. Accordingly, it is possible to securely recognize the state of the surroundings of the vehicle 5 in full.

Moreover, in the vehicle start support device 10 according to the first embodiment, the parking style determiner 50 determines the parking style executed in parking at the position where the vehicle 5 parks now, based on either of the presence and the absence of the parking frame D1 in which the vehicle 5 parks, the positional relationship between the endpoint positions F of the parking frame lines E constituting the parking frame D1 and the vehicle 5, the position of the adjacent vehicles A which are stopping and adjacent to the right and the left of the vehicle, the presence and the absence of the adjacent vehicles C which are stopping and adjacent to the vehicle 5 in the front and the rear thereof, and the presence and the absence of the obstacles G other than vehicles existing in the right and the left of the vehicle 5, and the position of the roadside portion H existing on the surroundings of the vehicle 5. Accordingly, it is possible to securely recognize the parking style executed in parking at the position where the vehicle 5 parks now.

Moreover, in the vehicle start support device 10 according to the first embodiment, the parking style determiner 50 can securely determine a type parking style and recognize to determine the perpendicular parking, the angle parking, the parallel parking, and other parking styles.

Moreover, in the vehicle start support device 10 according to the first embodiment, the start operation detector 48 detects that the ignition switch of the vehicle 5 is the ON state and the shift position of the vehicle 5 is the drive position, or the ignition switch of the vehicle 5 is the ON state and the shift position of the vehicle 5 is the reverse position. Accordingly, it is possible to simply and securely detect that there is a possibility that the vehicle 5 starts.

Moreover, in the vehicle start support device 10 according to the first embodiment, the monitoring area setter 52 sets the start direction of the vehicle 5, and of the right and left sides of the vehicle 5, a direction where the dead area of the driver of the vehicle 5 exists, to the monitoring area K, when it is determined in the parking style determiner 50 that the vehicle 5 executed the angle parking. In this case, when the vehicle surrounding state recognizer 46 detects the adjacent vehicles in the direction where the dead area of the driver exists, the vehicle surrounding state provider 54 provides the driver of the vehicle 5 with the image imaged in the starting direction of the vehicle 5 together with the display showing the presence of the dead area. Accordingly, it is possible to securely provide the driver with the information of the advance direction of the vehicle 5 and the dead area of the driver in starting the vehicle from the state of the angle parking. As a result, it is possible to execute the accurate information provision to support the driver regarding the start of the vehicle.

Moreover, in the vehicle start support device 10 according to the first embodiment, the monitoring area setter 52 sets the start direction of the vehicle 5, and the right and left sides of the vehicle 5, the direction where the dead area of the driver of the vehicle 5 exists, to the monitoring area K, when it is determined in the parking style determiner 50 that the vehicle 5 executed the angle parking. In this case, when the vehicle surrounding state recognizer 46 does not detect the adjacent vehicles in the direction where the dead area of the driver exists, the vehicle surrounding state provider 54 provides the driver of the vehicle 5 with the image imaged in the starting direction of the vehicle 5 and the direction where the dead area exists. Accordingly, it is possible to securely provide the driver with the information of the advance direction of the vehicle 5 and notify the dead area to the driver in starting the vehicle from the state of the angle parking. As a result, it is possible to execute the accurate information provision to support the driver regarding the start of the vehicle.

Moreover, in the vehicle start support device 10 according to the first embodiment, when it is determined in the parking style determiner 50 that the vehicle 5 executed the parallel parking and the adjacent vehicle is not detected in the rear of the vehicle in the vehicle surrounding state recognizer 46, the monitoring area setter 52 sets the side of the roadway and the rear of the vehicle 5 to the monitoring area K. Accordingly, it is possible to securely provide the driver with the information of the rear and the side of the vehicle 5 and notify the dead area to the driver in starting the vehicle from the state of the parallel parking. As a result, it is possible to execute the accurate information provision to support the driver regarding the start of the vehicle.

Moreover, in the vehicle start support device 10 according to the first embodiment, when it is determined in the parking style determiner 50 that the vehicle 5 executed the parallel parking, the start operation detector 48 detects that the shift position of the vehicle 5 is the drive position, and when the vehicle surrounding state recognizer 46 detects the adjacent vehicle in the rear of the vehicle 5, or when the start operation detector 48 detects that the shift position of the vehicle 5 is the reverse position and the vehicle surrounding state recognizer 46 detects the adjacent vehicle in the rear of the vehicle 5, the monitoring area setter 52 sets the side of the roadway of the vehicle 5 to the monitoring area K. Therefore, it is possible to set the monitoring area K having no dead area. As a result, it is possible for the driver to securely and smoothly start the vehicle without confusing the driver by the unnecessary information provision because the unnecessary attention attraction is not provided.

Moreover, in the vehicle start support device 10 according to the first embodiment, the information provision end determiner 56 allows the information provision to end by determining the end of the information provision from the vehicle surrounding state provider 54 based on the behavior of the vehicle 5, the recognition result of the vehicle surrounding state recognizer 46, and the determination result of the parking style determiner 50. Accordingly, when the starting operation of the vehicle 5 is completed and the vehicle is out of the parking frame, the information provision from the vehicle surrounding state provider 54 automatically ends. Therefore, the driver may not execute a special operation to end the information provision. In other words, the driving operation of the driver is not disturbed.

Moreover, in the vehicle start support device 10 according to the first embodiment, the vehicle start support device 10 further includes the distance measurer 44 to measure a distance to a three-dimensional object, and the vehicle surrounding state recognizer 46 recognizes the state of the surroundings of the vehicle 5 based on the images imaged by the imagers 20 and the measurement result of the distance measurer 44. Accordingly, it is possible to further accurately recognize the state of the surroundings of the vehicle 5. In addition, it is possible to efficiently execute the recognition processing by using the image information and the distance information together.

Moreover, in the vehicle start support device 15 according to the second embodiment, the vehicle start support device 15 further includes the determiner before parking 51a (secondary parking style determiner) that determines the parking style in executing the parking and determines the parking style of the vehicle 5 based on the determination result of the determiner before parking 51a and the determination result of the determiner before starting 51b (parking style determiner). Accordingly, it is possible to further securely determine the parking style in which the vehicle 5 took. In addition, in the determiner before starting 51b, it is possible to accomplish efficient parking style determination processing because whether the parking style determined in the determiner before parking 51a is actually taken may be confirmed in the determiner before starting 51b.

Although the several embodiments of the present invention have been described, it should be noted that the present invention is not limited to these embodiments, various modifications and changes can be made to the embodiments by those skilled in the art as long as such modifications and changes are within the scope of the present invention as defined by the Claims.

CROSS-REFERENCE TO RELATED APPLICATION

This application is based upon and claims the benefit of priority to Japanese Patent Application No. 2013-217301, filed on Oct. 18, 2013, the entire disclosures of which are incorporated herein by reference.

The invention claimed is:

1. A vehicle start support device comprising:
an imager including a plurality of cameras provided to direct different areas of a surrounding of a vehicle that has been parked, and imaging images including a part of the vehicle that has been parked and a road surface;
a start operation detector to detect that an operation having a possibility of starting the vehicle that has been parked is executed, and to detect, when detecting that the operation is executed, whether a shift position of the vehicle is a drive position or a reverse position;
a distance measurer to measure a distance to a three-dimensional object of the surrounding of the vehicle;
a vehicle surrounding state recognizer that recognizes a state of the surrounding of the vehicle that has been parked based on the images imaged by the cameras and a distance data measured by the distance measurer;
a parking style determiner that determines whether a parking style of the vehicle that has been parked is a perpendicular parking style, an angle parking style, a parallel parking style, or another parking style, based on a recognition result of the vehicle surrounding state recognizer when the start operation detector detects that the operation is executed;
a monitoring area setter that sets an area where a driver of the vehicle should pay attention in starting the vehicle from the determined parking style, based on a determination result of the parking style determiner, the recognition result of the vehicle surrounding state recognizer and whether the shift position detected by the start operation detector is the drive position or the reverse position;
a moving object detector that detects a moving object approaching the vehicle in the area set in the monitoring area setter;
a vehicle surrounding state provider that provides the driver of the vehicle with information with respect to an area necessary to attract attention in starting the vehicle from the determined parking style, based on a setting result of the monitoring area setter, the determination result of the parking style determiner, and a detection result of the moving object detector; and
an information provision end determiner that ends to provide the information by determining a timing that ends to provide the information from the vehicle surrounding state provider, based on at least a behavior of the vehicle,
wherein the parking style determiner determines a parking style executed in parking at a position where the vehicle parks now, based on either of the presence and the absence of the parking frame in which the vehicle parks, a positional relationship between endpoint positions of the parking frame lines constituting the parking frame and the vehicle, the position of the adjacent vehicles which are stopping and adjacent to the right and the left of the vehicle, the presence and the absence of the adjacent vehicles which are stopping and adjacent to the vehicle in the front and the rear thereof, and the presence and the absence of the obstacle other than vehicles existing in the right and the left of the vehicle, and the position of the roadside portion existing on the surrounding of the vehicle.

2. The vehicle start support device according to claim 1, wherein the vehicle surrounding state recognizer recognizes a position of parking frame lines constituting a parking frame in which the vehicle is parked, a position of parking frames adjacent to the vehicle, a position of adjacent vehicles adjacent to a right and a left of the vehicle, presence and absence of adjacent vehicles which are stopping and adjacent to the vehicle at a front and a rear thereof, presence and absence of an obstacle other than vehicles existing in the right and the left of the vehicle, and a position of a roadside portion existing on the surrounding of the vehicle.

3. The vehicle start support device according to claim 1, wherein the monitoring area setter sets a start direction of the vehicle, and of the right and left sides of the vehicle, a direction where a dead area of a driver of the vehicle exists, to a monitoring area, when it is determined in the parking style determiner that the vehicle executed an angle parking, wherein, when the vehicle surrounding state recognizer does not detect the adjacent vehicles in the direction where the dead area of the driver exists, the vehicle surrounding state provider provides the driver of the vehicle with an image imaged in the monitoring area.

4. The vehicle start support device according to claim 1, wherein the monitoring area setter sets a start direction of the vehicle, and of the right and left sides of the vehicle, a direction where a dead area of a driver of the vehicle exists, to a monitoring area, when it is determined in the parking style determiner that the vehicle executes an angle parking, wherein, when the vehicle surrounding state recognizer detects the adjacent vehicles in the direction where the dead area of the driver exists, the vehicle surrounding state provider provides the driver of the vehicle with an image imaged in the start direction of the vehicle together with a display representing the presence of the dead area.

5. The vehicle start support device according to claim 1, wherein, when it is determined in the parking style determiner that the vehicle executes a parallel parking and the adjacent vehicle is not detected in the rear of the vehicle in the vehicle surrounding state recognizer, the monitoring area setter sets the monitoring area to a side of a roadway and the rear of the vehicle.

6. The vehicle start support device according to claim 1, wherein, when it is determined in the parking style determiner that the vehicle executes a parallel parking, and when the start operation detector detects that a shift position of the vehicle is drive position and the adjacent vehicle is detected in the front of the vehicle in the vehicle surrounding state recognizer, or when the start operation detector detects that the shift position of the vehicle is the reverse position and the adjacent vehicle is detected in the rear of the vehicle in the vehicle surrounding state recognizer, the monitoring area setter sets the monitoring area to a side of a roadway.

7. The vehicle start support device according to claim 1, wherein the information provision end determiner allows the information provision to end by determining the end of the information provision from the vehicle surrounding state provider based on a behavior of the vehicle, the recognition result of the vehicle surrounding state recognizer, and the determination result of the parking style determiner.

8. The vehicle start support device according to claim 1, further comprising a secondary parking style determiner that determines a parking style of the vehicle in executing the parking, wherein the secondary parking style determiner determines the parking style of the vehicle based on a determination result of the secondary parking style determiner and the determination result of the parking style determiner.

9. A vehicle start support device comprising:
  an imager including a plurality of cameras provided to direct different areas of a surrounding of a vehicle that has been parked, and imaging images including a part of the vehicle that has been parked and a road surface;
  a start operation detector to detect that an operation having a possibility of starting the vehicle that has been parked is executed;
  a distance measurer to measure a distance to a three-dimensional object of the surrounding of the vehicle;
  a vehicle surrounding state recognizer that recognizes any one of a position of parking frame lines constituting a parking frame in which the vehicle is parked, a position of parking frames adjacent to the vehicle, a position of adjacent vehicles adjacent to a right and a left of the vehicle, presence and absence of adjacent vehicles that are stopped and adjacent to the vehicle at a front and a rear thereof, presence and absence of an obstacle other than vehicles existing in the right and the left of the vehicle, and a position of a roadside portion existing around the vehicle based on the images imaged by the cameras and a distance data measured by the distance measurer;
  a parking style determiner that determines whether a parking style of the vehicle that has been parked is a perpendicular parking style, an angle parking style, a parallel parking style, or another parking style, based on a recognition result of the vehicle surrounding state recognizer when the start operation detector detects that the operation is executed;
  a monitoring area setter that sets an area where a driver of the vehicle should pay attention in starting the vehicle from the determined parking style, based on a determination result of the parking style determiner, the recognition result of the vehicle surrounding state recognizer and whether the shift position detected by the start operation detector is the drive position or the reverse position;
  a moving object detector that detects a moving object approaching the vehicle in the area set in the monitoring area setter;
  a vehicle surrounding state provider that provides the driver of the vehicle with information with respect to an area necessary to attract attention in starting the vehicle from the determined parking style, based on a setting result of the monitoring area setter, the determination result of the parking style determiner, and a detection result of the moving object detector; and
  an information provision end determiner that ends to provide the information by determining a timing that ends to provide the information from the vehicle surrounding state provider, based on at least a behavior of the vehicle,
  wherein the parking style determiner determines a parking style executed in parking at a position where the vehicle parks now, based on either of the presence and the absence of the parking frame in which the vehicle parks, a positional relationship between endpoint positions of the parking frame lines constituting the parking frame and the vehicle, the position of the adjacent vehicles which are stopping and adjacent to the right and the left of the vehicle, the presence and the absence of the adjacent vehicles which are stopping and adjacent to the vehicle in the front and the rear thereof, and the presence and the absence of the obstacle other than vehicles existing in the right and the left of the vehicle, and the position of the roadside portion existing on the surrounding of the vehicle.

* * * * *